US012574779B2

(12) United States Patent
Ibrahim et al.

(10) Patent No.: US 12,574,779 B2
(45) Date of Patent: Mar. 10, 2026

(54) DETECTION AND REPORTING OF INTER-OPERATOR INTER-USER-EQUIPMENT CROSS-LINK INTERFERENCE

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 18/159,392

(22) Filed: Jan. 25, 2023

(65) Prior Publication Data

US 2023/0362700 A1    Nov. 9, 2023

Related U.S. Application Data

(60) Provisional application No. 63/364,306, filed on May 6, 2022.

(51) Int. Cl.
| *H04W 24/10* | (2009.01) |
| *H04W 72/21* | (2023.01) |
| *H04W 72/231* | (2023.01) |

(52) U.S. Cl.
CPC ........... *H04W 24/10* (2013.01); *H04W 72/21* (2023.01); *H04W 72/231* (2023.01)

(58) Field of Classification Search
CPC ... H04W 24/08; H04W 72/231; H04W 72/21; H04W 24/10
See application file for complete search history.

(56) References Cited

U.S. PATENT DOCUMENTS

| 2018/0323916 A1 | 11/2018 | Yang et al. |
| 2020/0169341 A1 | 5/2020 | Hwang et al. |
| 2021/0112503 A1* | 4/2021 | Zhang ................... H04W 24/08 |
| 2021/0321416 A1 | 10/2021 | Gaal et al. |
| 2022/0086843 A1* | 3/2022 | Ying ................... H04W 72/541 |

(Continued)

FOREIGN PATENT DOCUMENTS

| EP | 2858400 A1 | 4/2015 |
| WO | 2018228421 A1 | 12/2018 |

OTHER PUBLICATIONS

International Search Report and Written Opinion—PCT/US2023/019369—ISA/EPO—Jul. 20, 2023.

(Continued)

*Primary Examiner* — Brian D Nguyen
(74) *Attorney, Agent, or Firm* — QUALCOMM Incorporated

(57) ABSTRACT

Various aspects of the present disclosure generally relate to wireless communication. In some aspects, a user equipment (UE) may detect, during operation on a first channel associated with a first operator, cross-link interference (CLI) from a second channel associated with a second operator. The UE may transmit information associated with the CLI from the second channel Numerous other aspects are described.

30 Claims, 16 Drawing Sheets

(56)            References Cited

U.S. PATENT DOCUMENTS

| | | | | |
|---|---|---|---|---|
| 2022/0140959 A1* | 5/2022 | Pedersen | .............. | H04L 5/0053 |
| | | | | 370/329 |
| 2022/0303108 A1* | 9/2022 | Faxér | ................... | H04L 5/1461 |
| 2022/0386156 A1* | 12/2022 | Park | ...................... | H04W 24/10 |
| 2023/0014238 A1* | 1/2023 | Pocovi | ............. | H04W 72/0446 |
| 2023/0055304 A1* | 2/2023 | Shim | .................. | H04W 72/541 |
| 2023/0090986 A1* | 3/2023 | Jang | ........................ | H04W 8/22 |
| | | | | 370/329 |
| 2023/0180128 A1* | 6/2023 | Fang | ................ | H04W 52/0277 |
| | | | | 370/318 |

OTHER PUBLICATIONS

Media Tek Inc., "Cross-Link Interference Management", 3GPP TSG RAN WG1 Meeting NR#3, R1-1716217, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 12, 2017, XP051329838, pp. 1-5.

Qualcomm Incorporated: "Feasibility and Techniques for Subband Non-Overlapping Full Duplex", 3GPP TSG RAN WG1 #109-e, R1-2205031, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052191697, pp. 1-22.

* cited by examiner

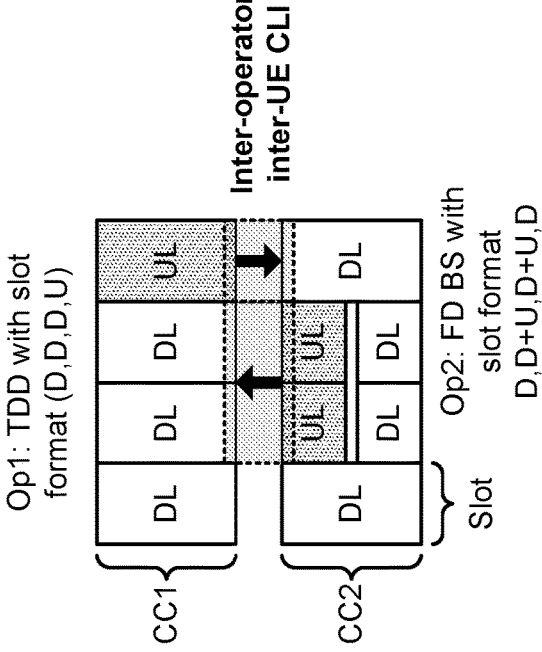
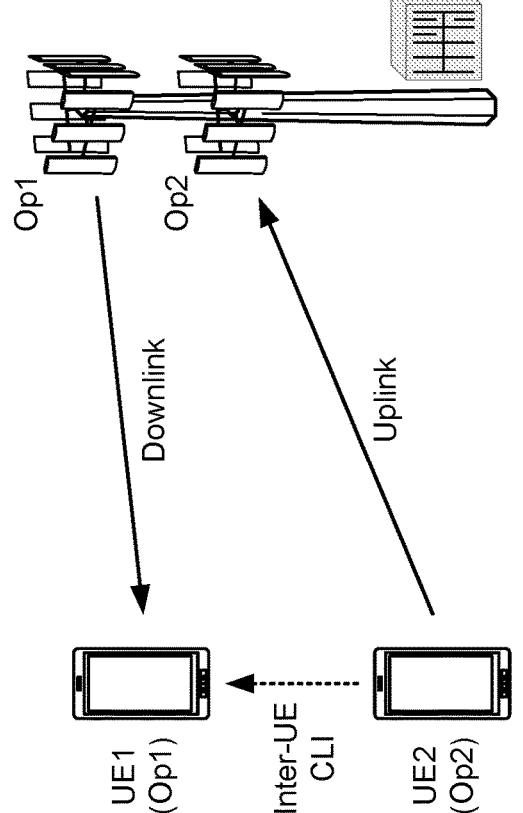
FIG. 4

| fields | Channel0 | Channel1 |
|--------|----------|----------|
| Band-A | A0 | A1 |
| Band-B | B0 | B1 |

| fields | Channels | Slot | Strength |
|--------|----------|------|----------|
| Band-A | A0,A1 | S0,...,SN | Pa |
| Band-B | B0,B1 | S0,...,SN | Pb |

FIG. 5C

610 Detect, during operation on a first channel associated with a first operator, cross-link interference (CLI) from a second channel associated with a second operator 620 Transmit UE assistance information (UAI) including information associated with the CLI from the second channel

600

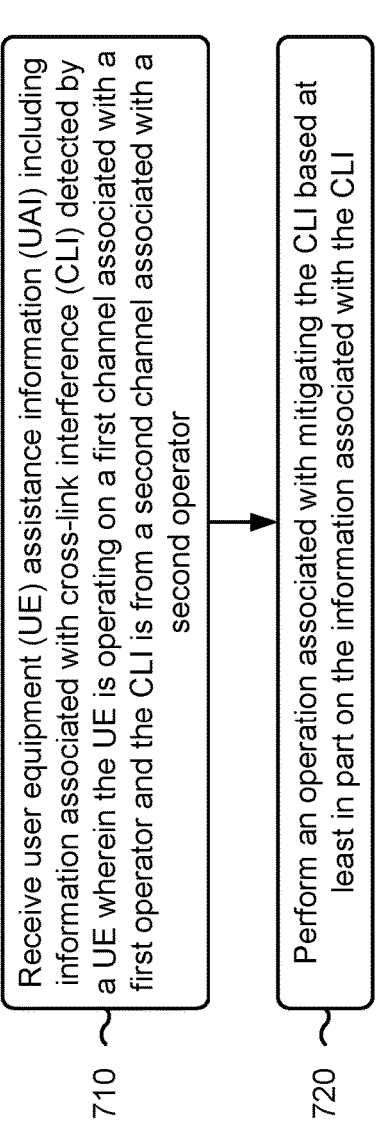

Receive user equipment (UE) assistance information (UAI) including information associated with cross-link interference (CLI) detected by a UE wherein the UE is operating on a first channel associated with a first operator and the CLI is from a second channel associated with a second operator Perform an operation associated with mitigating the CLI based at least in part on the information associated with the CLI

810 Detect, during operation on a first channel associated with a first operator, cross-link interference (CLI) from a second channel associated with a second operator 820 Transmit a medium access control (MAC) control element (CE) including information associated with the CLI from the second channel

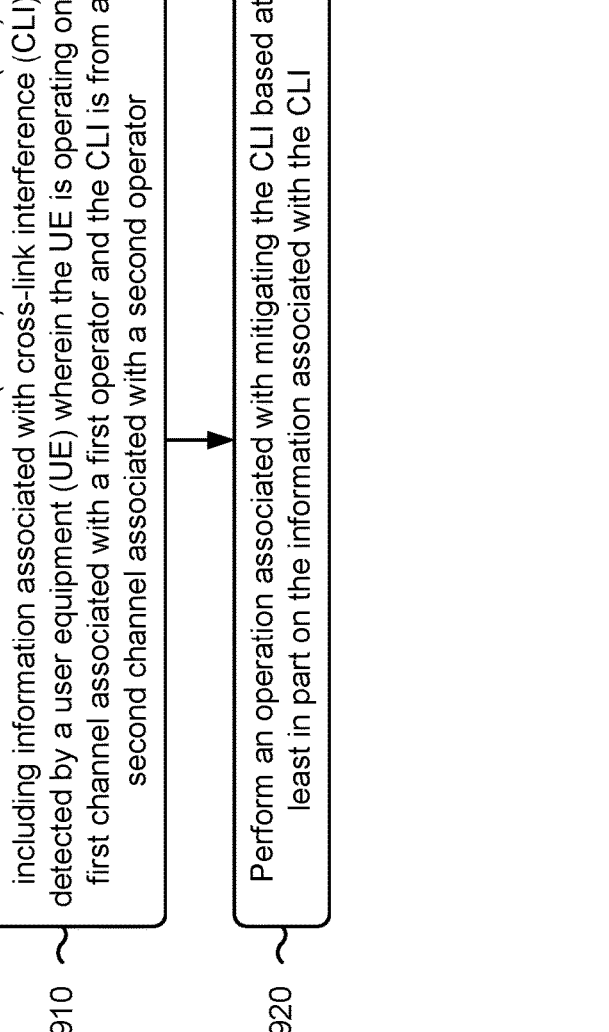

900

910 Receive a medium access control (MAC) control element (CE) including information associated with cross-link interference (CLI) detected by a user equipment (UE) wherein the UE is operating on a first channel associated with a first operator and the CLI is from a second channel associated with a second operator 920 Perform an operation associated with mitigating the CLI based at least in part on the information associated with the CLI

FIG. 9

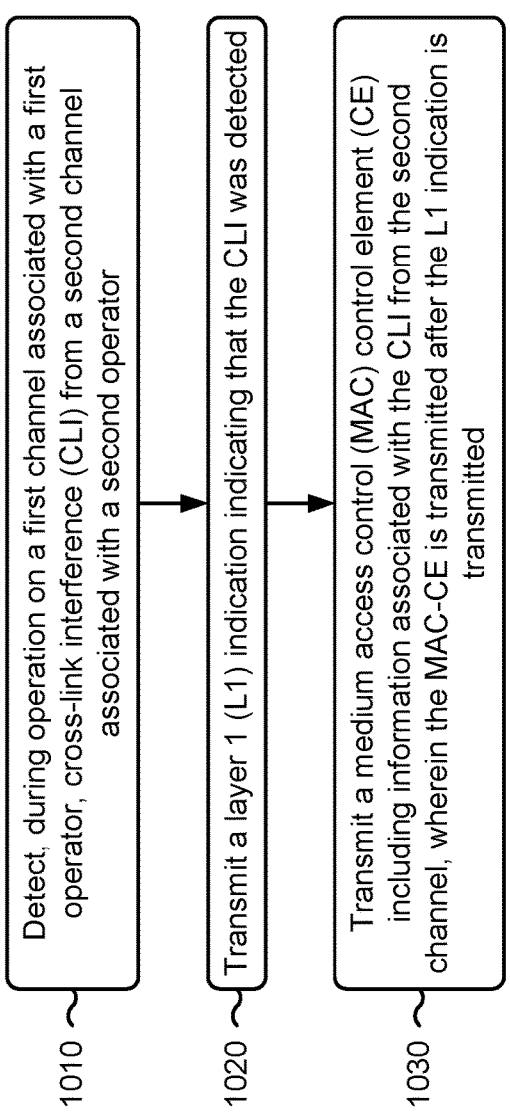

Detect, during operation on a first channel associated with a first operator, cross-link interference (CLI) from a second channel associated with a second operator

1010

Transmit a layer 1 (L1) indication indicating that the CLI was detected

1020

Transmit a medium access control (MAC) control element (CE) including information associated with the CLI from the second channel, wherein the MAC-CE is transmitted after the L1 indication is transmitted

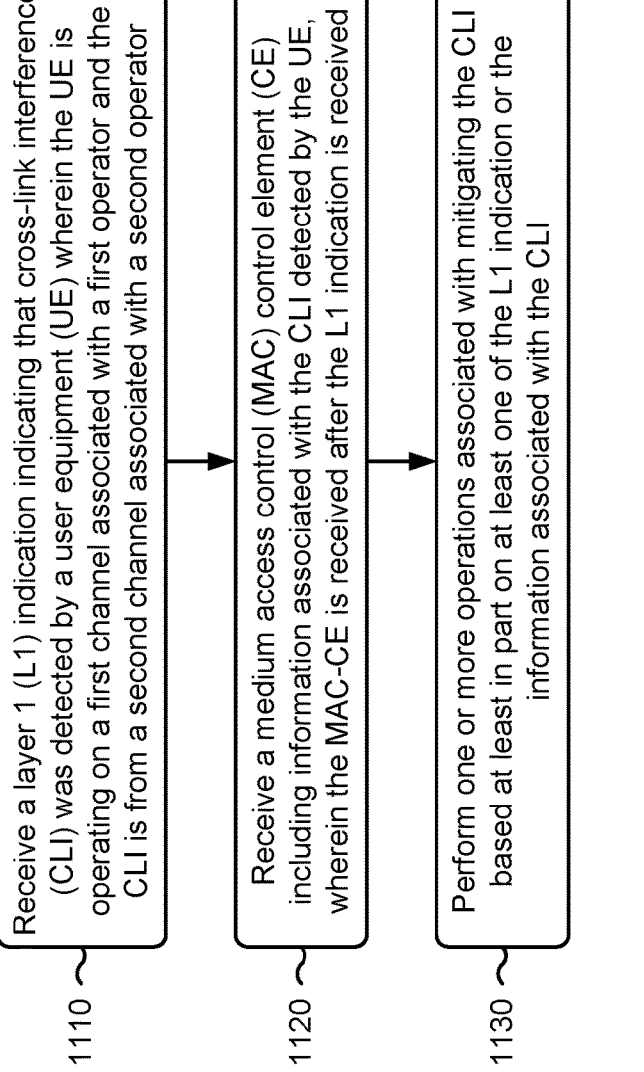

1110 — Receive a layer 1 (L1) indication indicating that cross-link interference (CLI) was detected by a user equipment (UE) wherein the UE is operating on a first channel associated with a first operator and the CLI is from a second channel associated with a second operator 1120 — Receive a medium access control (MAC) control element (CE) including information associated with the CLI detected by the UE, wherein the MAC-CE is received after the L1 indication is received 1130 — Perform one or more operations associated with mitigating the CLI based at least in part on at least one of the L1 indication or the information associated with the CLI

DETECTION AND REPORTING OF INTER-OPERATOR INTER-USER-EQUIPMENT CROSS-LINK INTERFERENCE

CROSS-REFERENCE TO RELATED APPLICATION

This Patent Applications claims priority to U.S. Provisional Patent Application No. 63/364,306, filed on May 6, 2022, entitled "DETECTION AND REPORTING OF INTER-OPERATOR INTER-USER-EQUIPMENT CROSS-LINK INTERFERENCE," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for detection and reporting of inter-operator inter-user-equipment (UE) cross-link interference.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include detecting, during operation on a first channel associated with a first operator, cross-link interference (CLI) from a second channel associated with a second operator. The method may include transmitting UE assistance information (UAI) including information associated with the CLI from the second channel.

Some aspects described herein relate to a method of wireless communication performed by a network entity. The method may include receiving UAI including information associated with CLI detected by a UE, where the UE is operating on a first channel associated with a first operator and the CLI is from a second channel associated with a second operator. The method may include performing an operation associated with mitigating the CLI based at least in part on the information associated with the CLI.

Some aspects described herein relate to a method of wireless communication performed by a UE. The method may include detecting, during operation on a first channel associated with a first operator, CLI from a second channel associated with a second operator. The method may include transmitting a medium access control (MAC) control element (CE) (MAC-CE) including information associated with the CLI from the second channel.

Some aspects described herein relate to a method of wireless communication performed by a network entity. The method may include receiving a MAC-CE including information associated with CLI detected by a UE, where the UE is operating on a first channel associated with a first operator and the CLI is from a second channel associated with a second operator. The method may include performing an operation associated with mitigating the CLI based at least in part on the information associated with the CLI.

Some aspects described herein relate to a method of wireless communication performed by a UE. The method may include detecting, during operation on a first channel associated with a first operator, CLI from a second channel associated with a second operator. The method may include transmitting a layer 1 (L1) indication indicating that the CLI was detected. The method may include transmitting a MAC-CE including information associated with the CLI from the second channel, wherein the MAC-CE is transmitted after the L1 indication is transmitted.

Some aspects described herein relate to a method of wireless communication performed by a network entity. The method may include receiving an L1 indication indicating that CLI was detected by a UE, where the UE is operating on a first channel associated with a first operator and the CLI is from a second channel associated with a second operator. The method may include receiving a MAC-CE including information associated with the CLI detected by the UE, wherein the MAC-CE is received after the L1 indication is received. The method may include performing one or more operations associated with mitigating the CLI based at least in part on at least one of the L1 indication or the information associated with the CLI.

Some aspects described herein relate to a UE for wireless communication. The UE may include a memory and one or more processors coupled to the memory. The one or more processors may be configured to detect, during operation on a first channel associated with a first operator, CLI from a second channel associated with a second operator. The one or more processors may be configured to transmit UAI including information associated with the CLI from the second channel.

Some aspects described herein relate to a network entity for wireless communication. The network entity may include a memory and one or more processors coupled to the memory. The one or more processors may be configured to receive UAI including information associated with CLI detected by a UE. The one or more processors may be configured to perform an operation associated with mitigating the CLI based at least in part on the information associated with the CLI.

Some aspects described herein relate to a UE for wireless communication. The UE may include a memory and one or more processors coupled to the memory. The one or more processors may be configured to detect, during operation on a first channel associated with a first operator, CLI from a second channel associated with a second operator. The one or more processors may be configured to transmit a MAC-CE including information associated with the CLI from the second channel.

Some aspects described herein relate to a network entity for wireless communication. The network entity may include a memory and one or more processors coupled to the memory. The one or more processors may be configured to receive a MAC-CE including information associated with CLI detected by a UE. The one or more processors may be configured to perform an operation associated with mitigating the CLI based at least in part on the information associated with the CLI.

Some aspects described herein relate to a UE for wireless communication. The UE may include a memory and one or more processors coupled to the memory. The one or more processors may be configured to detect, during operation on a first channel associated with a first operator, CLI from a second channel associated with a second operator. The one or more processors may be configured to transmit an L1 indication indicating that the CLI was detected. The one or more processors may be configured to transmit a MAC-CE including information associated with the CLI from the second channel, wherein the MAC-CE is transmitted after the L1 indication is transmitted.

Some aspects described herein relate to a network entity for wireless communication. The network entity may include a memory and one or more processors coupled to the memory. The one or more processors may be configured to receive an L1 indication indicating that CLI was detected by a UE. The one or more processors may be configured to receive a MAC-CE including information associated with the CLI detected by the UE, wherein the MAC-CE is received after the L1 indication is received. The one or more processors may be configured to perform one or more operations associated with mitigating the CLI based at least in part on at least one of the L1 indication or the information associated with the CLI.

Some aspects described herein relate to a non-transitory computer-readable medium that stores a set of instructions for wireless communication by a UE. The set of instructions, when executed by one or more processors of the UE, may cause the UE to detect, during operation on a first channel associated with a first operator, CLI from a second channel associated with a second operator. The set of instructions, when executed by one or more processors of the UE, may cause the UE to transmit UAI including information associated with the CLI from the second channel.

Some aspects described herein relate to a non-transitory computer-readable medium that stores a set of instructions for wireless communication by a network entity. The set of instructions, when executed by one or more processors of the network entity, may cause the network entity to receive UAI including information associated with CLI detected by a UE. The set of instructions, when executed by one or more processors of the network entity, may cause the network entity to perform an operation associated with mitigating the CLI based at least in part on the information associated with the CLI.

Some aspects described herein relate to a non-transitory computer-readable medium that stores a set of instructions for wireless communication by a UE. The set of instructions, when executed by one or more processors of the UE, may cause the UE to detect, during operation on a first channel associated with a first operator, CLI from a second channel associated with a second operator. The set of instructions, when executed by one or more processors of the UE, may cause the UE to transmit a MAC-CE including information associated with the CLI from the second channel.

Some aspects described herein relate to a non-transitory computer-readable medium that stores a set of instructions for wireless communication by a network entity. The set of instructions, when executed by one or more processors of the network entity, may cause the network entity to receive a MAC-CE including information associated with CLI detected by a UE. The set of instructions, when executed by one or more processors of the network entity, may cause the network entity to perform an operation associated with mitigating the CLI based at least in part on the information associated with the CLI.

Some aspects described herein relate to a non-transitory computer-readable medium that stores a set of instructions for wireless communication by a UE. The set of instructions, when executed by one or more processors of the UE, may cause the UE to detect, during operation on a first channel associated with a first operator, CLI from a second channel associated with a second operator. The set of instructions, when executed by one or more processors of the UE, may cause the UE to transmit an L1 indication indicating that the CLI was detected. The set of instructions, when executed by one or more processors of the UE, may cause the UE to transmit a MAC-CE including information associated with the CLI from the second channel, wherein the MAC-CE is transmitted after the L1 indication is transmitted.

Some aspects described herein relate to a non-transitory computer-readable medium that stores a set of instructions for wireless communication by a network entity. The set of instructions, when executed by one or more processors of the network entity, may cause the network entity to receive an L1 indication indicating that CLI was detected by a UE. The set of instructions, when executed by one or more processors of the network entity, may cause the network entity to receive a MAC-CE including information associated with the CLI detected by the UE, wherein the MAC-CE is received after the L1 indication is received. The set of instructions, when executed by one or more processors of the network entity, may cause the network entity to perform one or more operations associated with mitigating the CLI based at least in part on at least one of the L1 indication or the information associated with the CLI.

Some aspects described herein relate to an apparatus for wireless communication. The apparatus may include means for detecting, during operation on a first channel associated with a first operator, CLI from a second channel associated with a second operator. The apparatus may include means for transmitting UAI including information associated with the CLI from the second channel.

Some aspects described herein relate to an apparatus for wireless communication. The apparatus may include means for receiving UAI including information associated with CLI detected by a UE, where the UE is operating on a first channel associated with a first operator and the CLI is from a second channel associated with a second operator. The apparatus may include means for performing an operation associated with mitigating the CLI based at least in part on the information associated with the CLI.

Some aspects described herein relate to an apparatus for wireless communication. The apparatus may include means for detecting, during operation on a first channel associated with a first operator, CLI from a second channel associated with a second operator. The apparatus may include means for transmitting a MAC-CE including information associated with the CLI from the second channel.

Some aspects described herein relate to an apparatus for wireless communication. The apparatus may include means for receiving a MAC-CE including information associated with CLI detected by a UE, where the UE is operating on a first channel associated with a first operator and the CLI is from a second channel associated with a second operator. The apparatus may include means for performing an operation associated with mitigating the CLI based at least in part on the information associated with the CLI.

Some aspects described herein relate to an apparatus for wireless communication. The apparatus may include means for detecting, during operation on a first channel associated with a first operator, CLI from a second channel associated with a second operator. The apparatus may include means for transmitting an L1 indication indicating that the CLI was detected. The apparatus may include means for transmitting a MAC-CE including information associated with the CLI from the second channel, wherein the MAC-CE is transmitted after the L1 indication is transmitted.

Some aspects described herein relate to an apparatus for wireless communication. The apparatus may include means for receiving an L1 indication indicating that CLI was detected by a UE, where the UE is operating on a first channel associated with a first operator and the CLI is from a second channel associated with a second operator. The apparatus may include means for receiving a MAC-CE including information associated with the CLI detected by the UE, wherein the MAC-CE is received after the L1 indication is received. The apparatus may include means for performing one or more operations associated with mitigating the CLI based at least in part on at least one of the L1 indication or the information associated with the CLI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of inter-operator inter-UE cross-link interference (CLI), as described herein.

FIGS. 5A-5D are diagrams illustrating an example of detection and reporting of inter-operator inter-UE CLI, in accordance with the present disclosure.

FIGS. 6-11 are diagrams illustrating example processes associated with detection and reporting of inter-operator inter-UE CLI, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
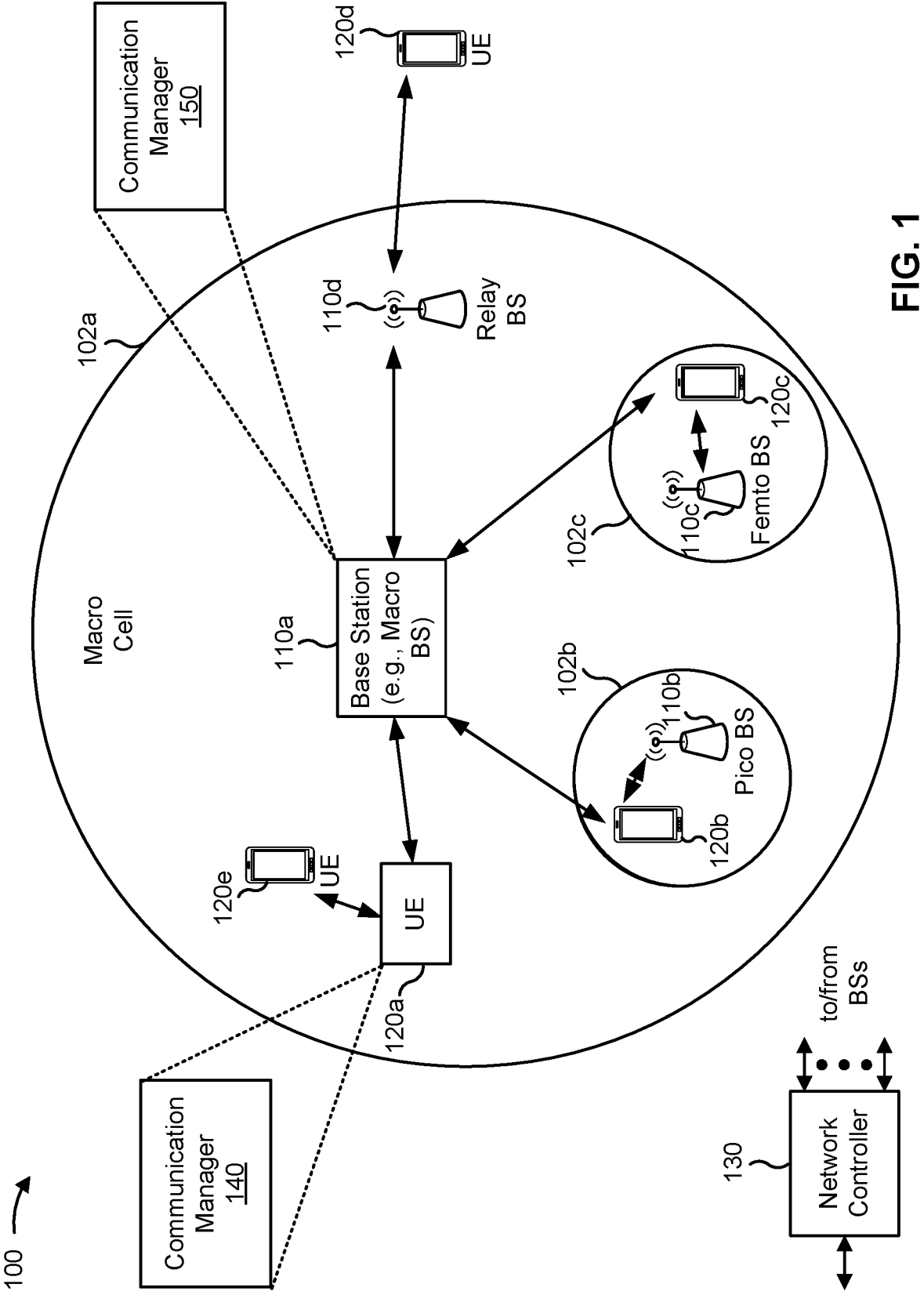
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. In some aspects, as described in more detail elsewhere herein, the communication manager 140 may detect, during operation on a first channel associated with a first operator, CLI from a second channel associated with a second operator; and transmit UAI including information associated with the CLI from the second channel Additionally, or alternatively, as described in more detail elsewhere herein, the communication manager 140 may detect, during operation on a first channel associated with a first operator, CLI from a second channel associated with a second operator; and transmit a MAC-CE including information associated with the CLI from the second channel Additionally, or alternatively, as described in more detail elsewhere herein, the communication manager 140 may detect, during operation on a first channel associated with a first operator, CLI from a second channel associated with a second operator; transmit an L1 indication indicating that the CLI was detected; and transmit a MAC-CE including information associated with the CLI from the second channel, wherein the MAC-CE is transmitted after the L1 indication is transmitted. Additionally, or alternatively, the communication manager 140 may perform one or more other operations described herein.

In some aspects, a network entity, such as the base station 110, may include a communication manager 150. In some aspects, as described in more detail elsewhere herein, the communication manager 150 may receive UAI including information associated with CLI detected by a UE, wherein the UE is operating on a first channel associated with a first operator and the CLI is from a second channel associated with a second operator; and perform an operation associated with mitigating the CLI based at least in part on the information associated with the CLI. Additionally, or alternatively, as described in more detail elsewhere herein, the communication manager 150 may receive a MAC-CE including information associated with CLI detected by a UE, wherein the UE is operating on a first channel associated with a first operator and the CLI is from a second channel associated with a second operator; and perform an operation associated with mitigating the CLI based at least in part on the information associated with the CLI. Additionally, or alternatively, as described in more detail elsewhere herein, the communication manager 150 may receive an L1 indication indicating that CLI was detected by a UE, wherein the UE is operating on a first channel associated with a first operator and the CLI is from a second channel associated with a second operator; receive a MAC-CE including information associated with the CLI detected by the UE, wherein the MAC-CE is received after the L1 indication is received; and perform one or more operations associated with mitigating the CLI based at least in part on at least one of the L1 indication or the information associated with the CLI. Additionally, or alternatively, the communication manager 150 may perform one or more other operations described herein.

As indicated above, FIG. 1 is provided as an example. Other examples may differ from what is described with regard to FIG. 1.

Figure 2:
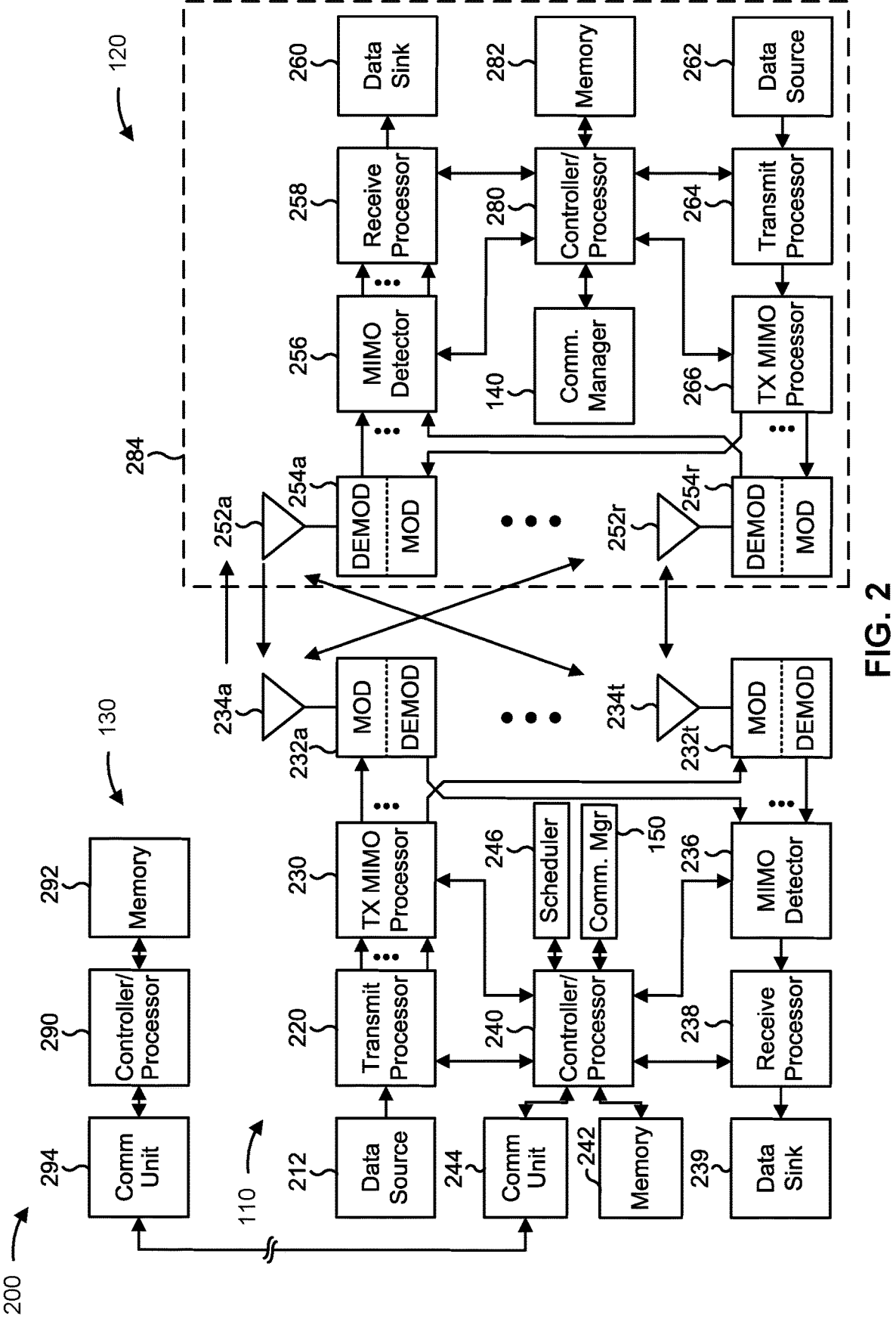
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-13).

The controller/processor 240 of the base station 110, the controller/processor 280 of the UE 120, and/or any other component(s) of FIG. 2 may perform one or more techniques associated with detection and reporting of inter-operator inter-UE cross-link interference, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., the UE 120) includes means for detecting, during operation on a first channel associated with a first operator, cross-link interference (CLI) from a second channel associated with a second operator; and/or means for transmitting UE assistance information (UAI) including information associated with the CLI from the second channel. In some aspects, the UE includes means for detecting, during operation on a first channel associated with a first operator, CLI from a second channel associated with a second operator; and/or means for transmitting a MAC-CE including information associated with the CLI from the second channel. In some aspects, the UE includes means for detecting, during operation on a first channel associated with a first operator, CLI from a second channel associated with a second operator; means for transmitting an L1 indication indicating that the CLI was detected; and/or means for transmitting a MAC-CE including information associated with the CLI from the second channel, wherein the MAC-CE is transmitted after the L1 indication is transmitted. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., a base station 110) includes means for receiving UAI including information associated with CLI detected by a UE, wherein the UE is operating on a first channel associated with a first operator and the CLI is from a second channel associated with a second operator; and/or means for performing an operation associated with mitigating the CLI based at least in part on the information associated with the CLI. In some aspects, the network entity includes means for receiving a MAC-CE including information associated with CLI detected by a UE, wherein the UE is operating on a first channel associated with a first operator and the CLI is from a second channel associated with a second operator; and/or means for performing an operation associated with mitigating the CLI based at least in part on the information associated with the CLI. In some aspects, the network entity includes means for receiving an L1 indication indicating that CLI was detected by a UE, wherein the UE is operating on a first channel associated with a first operator and the CLI is from a second channel associated with a second operator; means for receiving a MAC-CE including information associated with the CLI detected by the UE, wherein the MAC-CE is received after the L1 indication is received; and/or means for performing one or more operations associated with mitigating the CLI based at least in part on at least one of the L1 indication or the information associated with the CLI. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
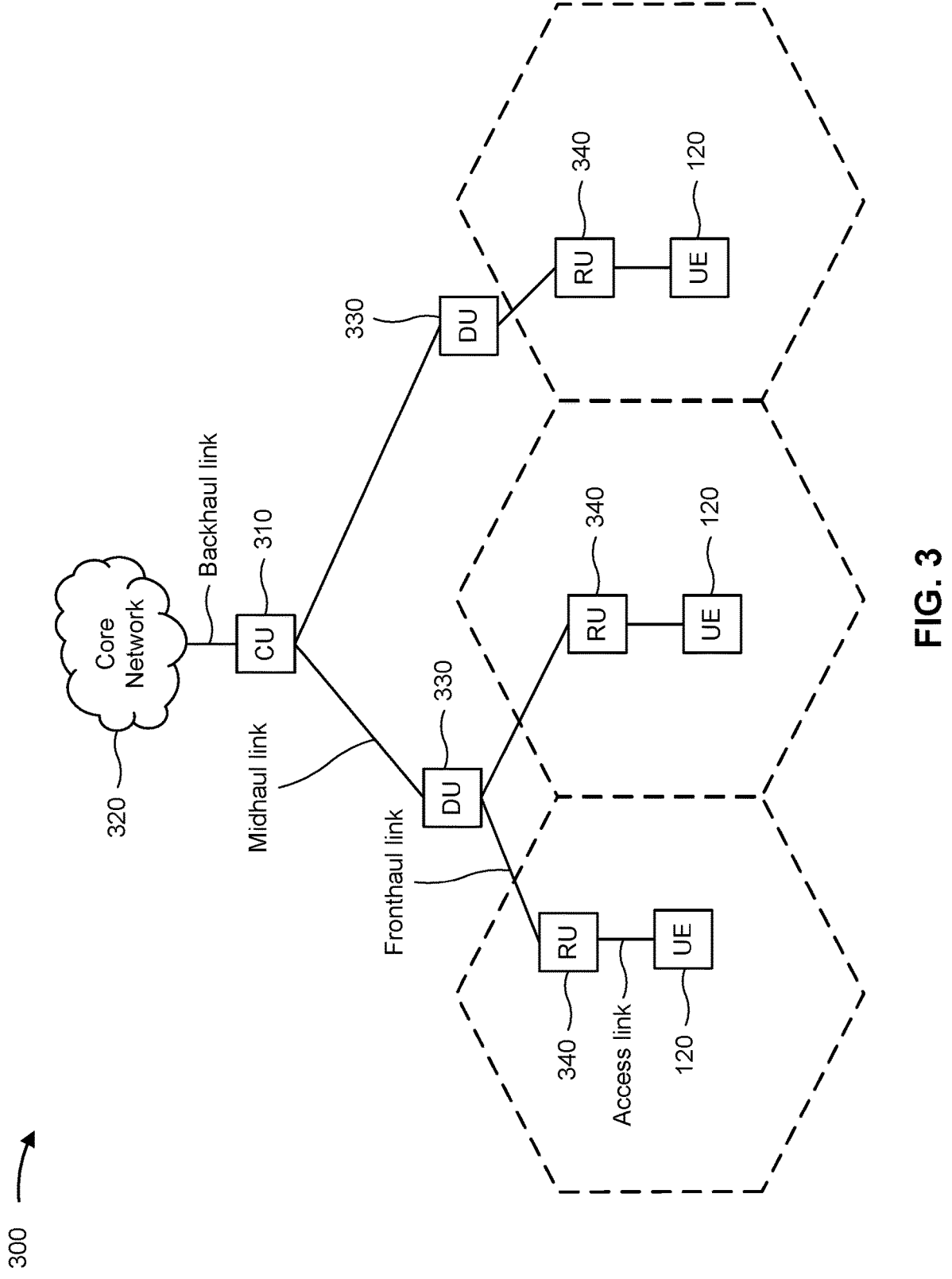
FIG. 3 is a diagram illustrating an example 300 of an open radio access network (O-RAN) architecture, in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

A wireless communication system may support full duplex (FD) communication. One type of FD communication is in-band FD (IBFD) communication, which allows a wireless communication device to transmit uplink communications and receive downlink communications on the same time/frequency resource. Here, the uplink and the downlink share the same time/frequency resource (i.e., the uplink resource and the downlink resource at least partially overlap in time and frequency). Another type of FD communication is sub-band FD (SBFD) communication (also referred to as flexible duplex), which allows a wireless communication device to transmit uplink communications and receive downlink communications at the same time, but on different frequency resources. Here, the downlink resource is separated from the uplink resource in the frequency domain (e.g., by a guard band). Notably, a given wireless communication system may be designed to support wireless communications among FD network entities (e.g., base stations) and half duplex (HD) UEs, wireless communications among FD network entities and FD UEs, wireless communications among FD network entities with multiple transmission/reception points (multi-TRP) and SBFD UEs, or the like.

With respect to FD communication, a slot that is defined as downlink+uplink (D+U) slot is a slot in which a frequency band is used for both uplink communication and downlink communication. Here, the downlink and uplink communications can occur in overlapping frequency resources in the frequency band (e.g., in the case of IBFD) or separate frequency resources in the frequency band (e.g., in the case of SBFD). In a given symbol of a D+U slot, an HD UE can either transmit a communication in an uplink frequency resource or receive a communication in a downlink frequency resource. Conversely, in a given symbol of a D+U slot, an FD UE can transmit a communication in an uplink frequency resource and/or receive a communication in a downlink frequency resource. A D+U slot can include downlink-only symbols, uplink-only symbols, FD symbols, or some combination thereof.

One potential drawback that can result from FD communication is cross-link interference (CLI). CLI caused by one network entity (e.g., a first base station) at another network entity (e.g., a second base station) is referred to as inter-network-entity (e.g., inter-gNB) CLI. CLI caused by one UE at another UE is referred to as inter-UE CLI. Further, CLI caused by a wireless communication device (e.g., a network entity or a UE) associated with a given operator at another wireless communication device (e.g., another network entity or another UE) associated with the same operator is referred to as intra-operator CLI or co-channel CLI (since the CLI occurs within a particular channel associated with the operator). Conversely, CLI caused by a wireless communication device (e.g., a network entity or a UE) associated with a first operator at another wireless communication device (e.g., another network entity or another UE) associated with a second operator is referred to as inter-operator CLI or adjacent-adjacent channel CLI (since the CLI occurs between a channel associated with the first operator and a channel associated with the second operator).

FIG. 4 is a diagram illustrating an example of inter-operator inter-UE CLI, as described herein. In FIG. 4, a first UE (UE1) is associated with a first operator (Op1) and a second UE (UE2) is associated with a second operator (Op2). In this example, the first operator utilizes time-division duplexing (TDD) for communication in a first component carrier (CC1) and the second operator utilizes FD network entities for communication in a second component carrier (CC2) that is adjacent to the first component carrier. Slot formats for an example set of four slots are shown in FIG. 4. As shown, the slot formats on the first component carrier are downlink in a first slot, downlink in a second slot, downlink in a third slot, and uplink in a fourth slot (D, D, D, U) and the slot formats on the second component carrier are downlink in the first slot, D+U in the second slot, D+U in the third slot, and downlink in the fourth slot (D, D+U, D+U, D). As indicated in FIG. 4, inter-operator inter-UE CLI occurs in the second slot, the third slot, and the fourth slot. For example, the second UE transmits one or more uplink communications in the second slot and the third slot, which causes CLI in the corresponding downlink slots at the first UE. Similarly, the first UE transmits one or more uplink communications in the fourth slot, which causes CLI in the corresponding downlink slot at the second UE. In this way, inter-operator inter-UE CLI is caused at a UE associated with one operator by interference leakage from an adjacent channel associated with another operator.

In general, intra-operator CLI can be mitigated through configuration of the wireless communication system of the operator. For example, intra-operator inter-network-entity CLI can be mitigated through coordination among network entities of the wireless communication system (e.g., through spatial separation facilitated by beam or codebook restrictions, through power or scheduling adaptation facilitated by power back-off or bandwidth part FD partitioning, or the like) or through inter-network-entity CLI channel measurement (e.g., so that CLI can be nulled or canceled). As another example, intra-operator inter-UE CLI can be mitigated through a UE-reporting-based technique (e.g., CLI aided scheduling, beam or codebook restrictions, or the like) or a UE-based technique (e.g., spatial nulling, receiver filtering, or the like).

Such techniques are not possible for mitigation of inter-operator CLI because coordination among wireless communication devices associated with different operators is generally not possible. Therefore, conventional techniques for mitigation of inter-operator CLI include maximizing separation between frequency resources used for uplink and frequency resources used for downlink communication and, in the case of inter-network-entity CLI, maintaining spatial separation of co-located antennas at a given network entity. However, such techniques may be undesirable since, for example, separation of frequency resources reduces utilization of the channel and, therefore, reduces network efficiency and performance.

Some aspects described herein provide techniques and apparatuses for detection and reporting of inter-operator inter-UE CLI. In some aspects, a UE may detect, during operation on a first channel associated with a first operator, CLI from a second channel associated with a second operator, and may transmit information associated with the CLI from the second channel. In some aspects, a network entity (e.g., a base station) may receive the information associated with the CLI from the second channel, and may perform an operation associated with mitigating the CLI from the second channel based at least in part on the information associated with the CLI. The information associated with the CLI may be included in, for example, UE assistance information (UAI) or a medium access control (MAC) control element (CE). In this way, mitigation of inter-operator inter-UE CLI may be achieved, thereby improving reliability of wireless communication in the presence of inter-operator inter-UE CLI. Further, the mitigation of inter-operator inter-UE CLI enables improved channel utilization and, therefore, increases network efficiency and overall network performance. Additional details are provided below.

FIGS. 5A-5D are diagrams illustrating examples of detection and reporting of inter-operator inter-UE CLI, in accordance with the present disclosure. As shown in FIGS. 5A-5D, a UE 502 and a network entity 504 may exchange wireless communications. In some aspects, the UE 502 corresponds to a UE 120 or an apparatus 1200, as described herein. In some aspects, the network entity 504 corresponds to a base station 110 or an apparatus 1300, as described herein. In some aspects, the UE 502 and the network entity 504 may be included in a wireless network, such as wireless network 100. The UE 502 and the network entity 504 may communicate via a wireless access link, which may include an uplink and a downlink.

In the examples shown in FIGS. 5A-5D, the UE 502 and the network entity 504 are associated with a first operator (Op1) that utilizes a first channel (Ch1) to enable wireless communication between the UE 502 and the network entity 504. Further, in these examples, a UE 506 is associated with a second operator (Op2) that utilizes a second channel (Ch2) to enable wireless communication involving the UE 506. Here, the first channel and the second channel are near one another in frequency (e.g., the first channel and the second channel are adjacent channels).

Figure 5A:
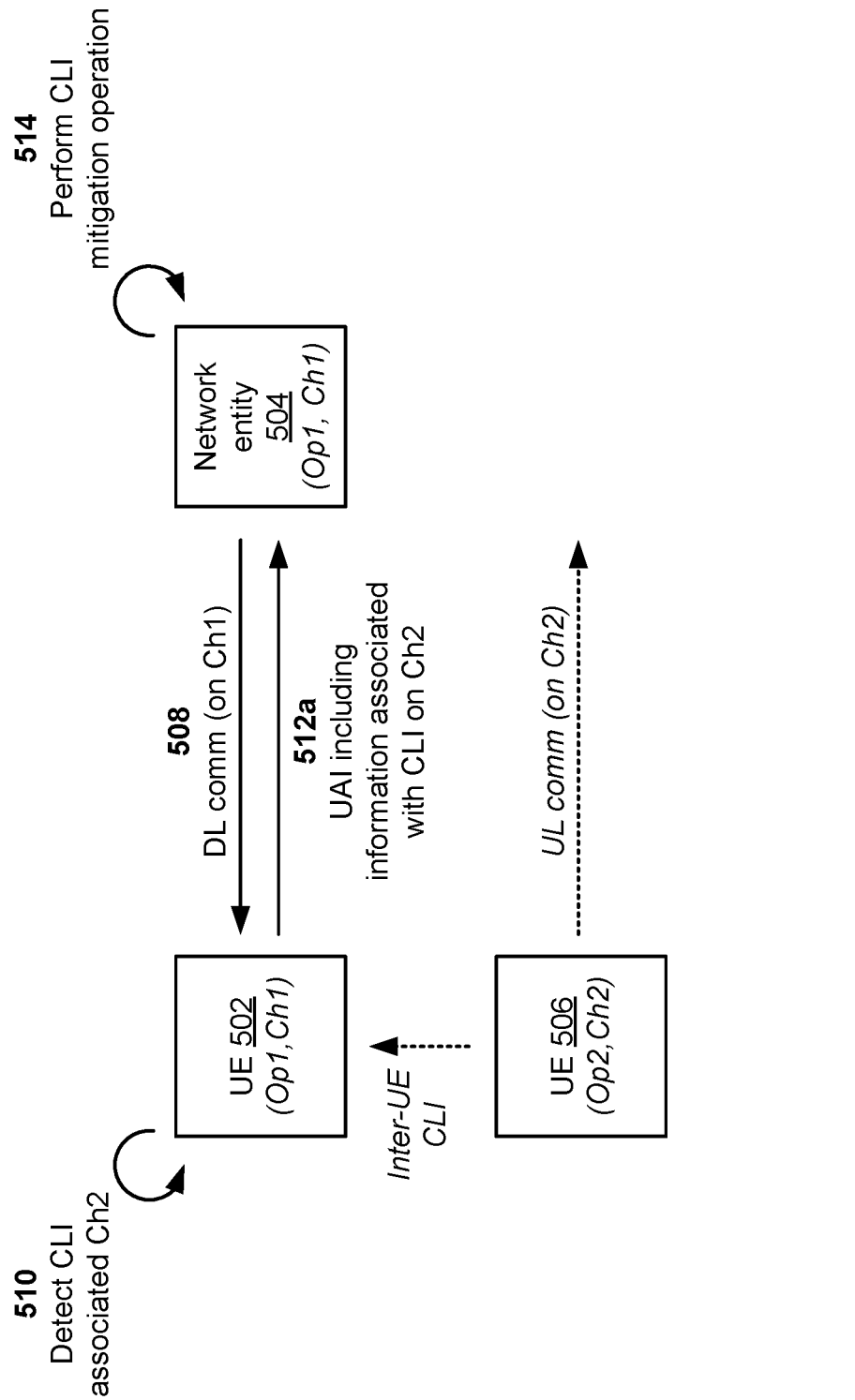

FIG. 5A illustrates a first example associated with detection and reporting of inter-operator inter-UE CLI. As shown by reference 508, the network entity 504 may transmit, and the UE 502 may receive, a downlink communication in resources of the first channel associated with the first operator.

As shown by reference 510, the UE 502 may detect, during operation on the first channel associated with the first operator, CLI from the second channel associated with the second operator. For example, as shown in FIG. 5A, the UE 506 may transmit an uplink communication in a same slot in which the UE 502 is to receive the downlink communication. In this scenario, the uplink communication may cause inter-operator inter-UE at the UE 502. In some aspects, the UE 502 includes a CLI detection component that enables the UE 502 to sense inter-operator CLI (e.g., CLI from a channel adjacent to or near a channel of a frequency band in which the UE 502 is operating). Thus, in the example shown in FIG. 5A, the UE 502 may be capable of detecting blocking caused by inter-operator inter-UE CLI.

As shown by reference 512a, the UE 502 may transmit, and the network entity 504 may receive, UE assistance information (UAI) including information associated with the CLI from the second channel. In some aspects, UAI is communicated via a layer 3 (L3) communication (e.g., via RRC signaling). In some aspects, the UE 502 may transmit, and the network entity 504 may receive, the information associated with the CLI from the second channel in another type of information conveyed in an L3 communication.

In some aspects, the information associated with the CLI includes a binary indication indicating that the CLI was detected in the first channel That is, in some aspects, the UAI may include a binary indication of whether blocking was detected in the first channel as a result of CLI from the second channel. In some aspects, the binary indication may include a one-bit indication that indicates whether the UE 502 has detected CLI in the first channel (e.g., a value of 1 may indicate that CLI was detected and a value of 0 may indicate that CLI was not detected).

Additionally, or alternatively, the binary indication may in some aspects include a bitmap comprising two or more bits, where each bit in the bitmap is associated with one or more channels. For example, in addition to detecting CLI from the second channel, the UE 502 may in some aspects be capable of detecting CLI from a third channel (e.g., another channel that is adjacent to the first channel). Here, a first bit in the bitmap may be used to indicate whether the UE 502 has detected CLI from the second channel, and a second bit in the bitmap may be used to indicate whether the UE 502 has detected CLI from the third channel. As another example, in addition to detecting CLI from the second channel, the UE 502 may in some aspects be capable of detecting CLI from one or more channels higher in frequency than the first channel and one or more channels lower in frequency from the first channel Here, a first bit in the bitmap may be used to indicate whether the UE 502 has detected CLI from any of the one or more higher-frequency channels, and a second bit in the bitmap may be used to indicate whether the UE 502 has detected CLI from any of the one or more lower-frequency channels. Notably, in this example, the multiple channels can be associated with the same bit in the bitmap (i.e., channels can be grouped together for the purpose of indicating CLI detection).

In some aspects, the information associated with the CLI includes an indication of one or more characteristics of the CLI. For example, the information associated with the CLI may include an indication of a strength of the CLI. As another example, the information associated with the CLI may include an indication of a frequency location of the second channel (e.g., an indication of a particular channel that is causing the CLI). As another example, the information associated with the CLI may include an indication of one or more slots in which the CLI was detected (e.g., a bitmap indicating slots of a frame in which the UE 502 detected the CLI).

In some aspects, the information associated with the CLI may include information associated with a UE preference. For example, the information associated with the UE preference may include an indication of a component carrier preferred by the UE 502 (e.g., a component carrier identified by the UE 502 as a component carrier that, if utilized, could reduce CLI from the second channel). As another example, the information associated with the UE preference may include an indication of a bandwidth part preferred by the UE 502 (e.g., a bandwidth part identified by the UE 502 as a bandwidth part that, if utilized, could reduce CLI from the second channel). As another example, the information associated with the UE preference may include an indication of a downlink transmission power preferred by the UE 502 (e.g., a downlink transmission power identified by the UE 502 as a downlink transmission power that, if utilized, could reduce an impact of CLI from the second channel). As another example, the information associated with the UE preference may include an indication of a timing advance (TA) preferred by the UE 502 (e.g., a TA identified by the UE 502 as a TA that, if utilized, could reduce an impact of CLI from the second channel).

In some aspects, the UE 502 may transmit the UAI based at least in part on a time-based trigger associated with adjacent channel CLI reporting. For example, the UE 502 may be configured with an adjacent channel CLI reporting timer, and transmit UAI indicating whether CLI was detected during a period of time prior to the expiration of the adjacent channel CLI reporting timer (e.g., a period of time during which the adjacent channel CLI reporting timer was running). In some aspects, the UE 502 may restart the adjacent channel CLI reporting timer and repeat this process. In this way, the UE 502 may be configured to provide the UAI associated with detection of adjacent channel CLI on a periodic basis.

In some aspects, the UE 502 may transmit the UAI based at least in part on an event-based trigger associated with adjacent channel CLI reporting. For example, the UE 502 may be configured to transmit UAI including information associated with CLI detected on the second channel when a characteristic of the CLI from the second channel satisfies a threshold (e.g., when a received signal strength of the CLI from the second channel is greater than or equal to a threshold received signal strength). In some aspects, the UE 502 may transmit UAI based at least in part on a combination of a time-based trigger and an event-based trigger.

In some aspects, the UE 502 may transmit, and the network entity 504 may receive, UE capability information associated with detection or reporting of inter-operator CLI by the UE 502. For example, in some wireless communication systems, support of detection and reporting of inter-operator inter-UE CLI may be optional depending on a UE capability. The UE capability information may include, for example, an indication that the UE 502 supports detection and reporting of inter-operator inter-UE CLI. In some aspects, the UE capability information indicates whether the UE 502 supports a particular technique for providing information associated with CLI detected in an adjacent channel, such as by providing UAI (e.g., as described with respect to FIG. 5A), by providing an uplink MAC-CE (e.g., as described below with respect to FIGS. 5B and 5C), or using a hybrid approach (e.g., as described below with respect to FIG. 5D). In some aspects, the UE capability information can be per-UE, per-frequency-band, or per-frequency-band combination.

In some aspects, as shown by reference 514, the network entity 504 may perform an operation associated with mitigating the CLI from the second channel based at least in part on the information associated with the CLI.

In some aspects, the operation associated with mitigating the CLI may include modifying a parameter associated with transmitting communications to the UE 502. That is, in some aspects, the network entity 504 can adapt a transmission parameter to be used in association with transmitting downlink communications to the UE 502 in order to mitigate the impact of the CLI from the second channel.

Additionally, or alternatively, the operation associated with mitigating the CLI may include scheduling the UE 502 on a resource selected based at least in part on the information associated with the CLI. That is, in some aspects, the network entity 504 can schedule the UE 502 on a different time/frequency resource in order to mitigate the impact of the CLI from the second channel. For example, the network entity 504 may schedule the UE 502 on a slot on which CLI is not expected or detected. As another example, the network entity 504 may schedule the UE 502 on a frequency resource that is further away from the second channel in the frequency domain.

Additionally, or alternatively, the operation associated with mitigating the CLI may include modifying a format of a slot to be used for communicating with the UE 502. For example, if multiple UEs 502 have detected CLI leakage from the second channel in a given slot, then the network entity 504 may modify a format of an upcoming slot (e.g., by changing the slot to an uplink slot) in order to mitigate the impact of the CLI from the second channel.

Figure 5B:
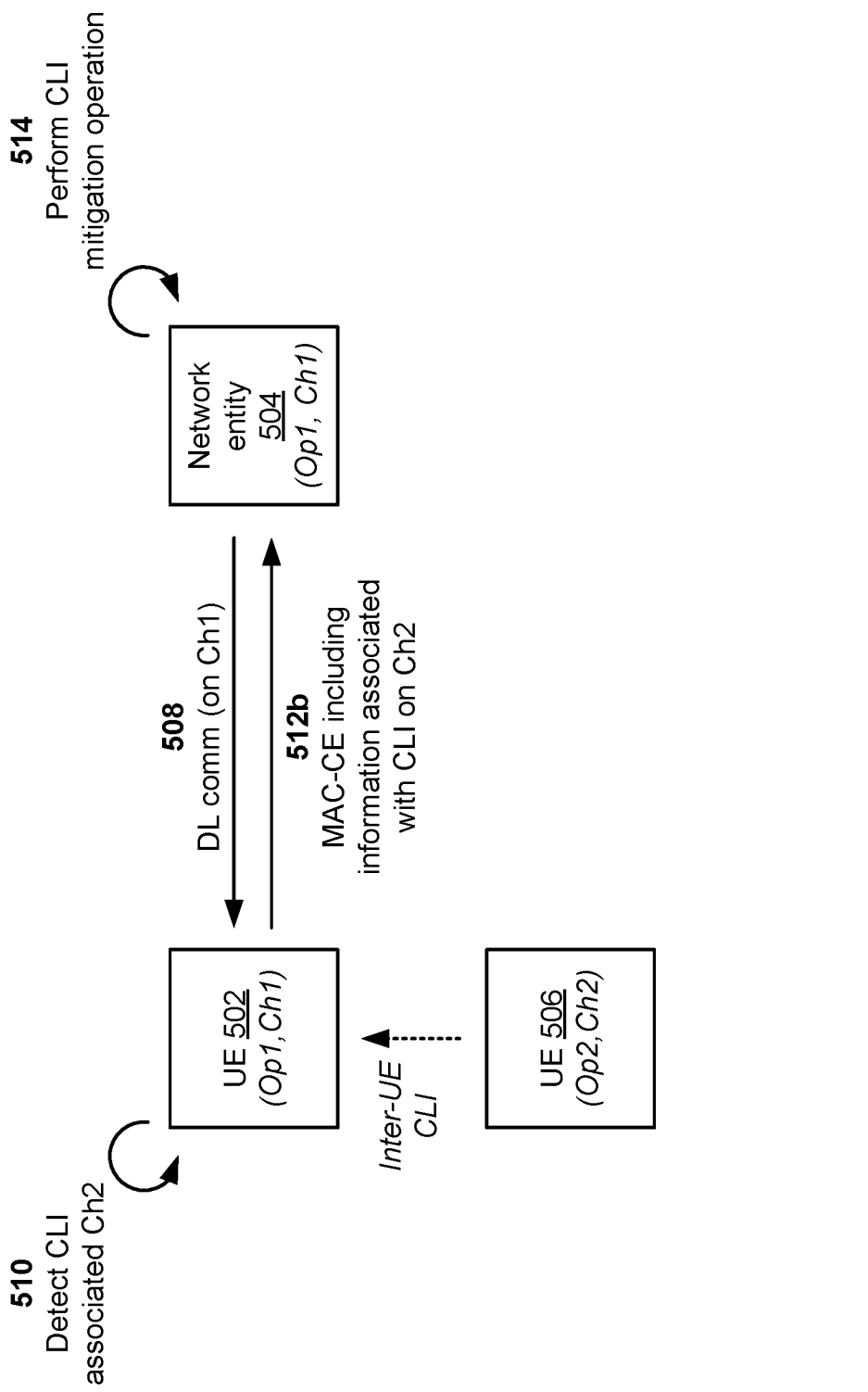

FIG. 5B illustrates a second example associated with detection and reporting of inter-operator inter-UE CLI. The example shown in FIG. 5B is similar to the example in FIG. 5A except that in some aspects the UE 502 may transmit, and the network entity 504 may receive, the information associated with the CLI from the second channel in a MAC-CE, as shown by reference 512b.

In some aspects, communication of the information associated with the CLI via a MAC-CE may be utilized to address dynamic CLI caused by, for example, dynamic slot format indication (e.g., when the network entity 504 can dynamically change or configure a communication direction of a flexible slot using a slot format indicator (SFI)). Other operations shown in FIG. 5B may be performed in a manner similar to that described in association with FIG. 5A. FIG. 5C includes diagrams illustrating example structures for MAC-CEs including information associated with CLI.

Figure 5D:
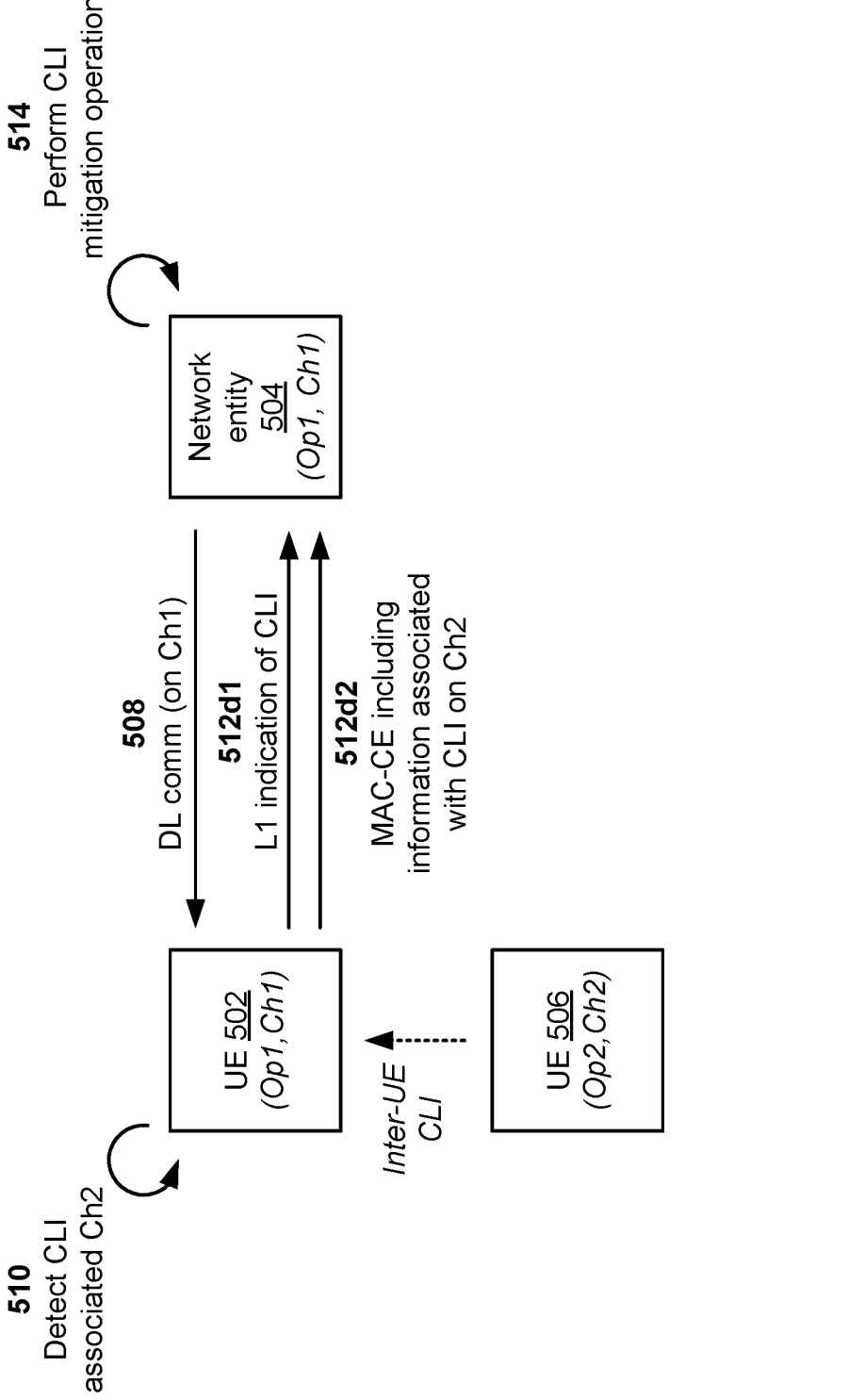

FIG. 5D illustrates a third example associated with detection and reporting of inter-operator inter-UE CLI. The example shown in FIG. 5D is similar to the example in FIG. 5A except that in some aspects the information associated with the CLI from the second channel is communicated using a hybrid approach. For example, as shown by reference 512d1, the UE 502 may transmit, and the network entity 504 may receive, a layer 1 (L1) indication indicating that the CLI was detected. In some aspects, the L1 indication is transmitted in one or more bits of uplink control information (UCI). In some aspects, the L1 indication is a binary indication indicating that the CLI was detected in the first channel. In some aspects, the UE 502 may transmit the L1 indication on a periodic basis or on an on-demand basis (e.g., based at least in part on a request from the network entity 504). Next, as shown by reference 512d2, the UE 502 may transmit, and the network entity 504 may receive, a MAC-CE including the information associated with the CLI from the second channel. In some aspects, the MAC-CE may be similar to that described above with respect to FIG. 5B.

In some aspects, using the hybrid approach of communicating the L1 indication and communicating the information associated with the CLI via a MAC-CE may be utilized to enable the network entity 504 to quickly adapt a parameter used in association with communicating with the UE 502 to mitigate an impact of the CLI. For example, upon receiving the L1 indication, the network entity 504 may lower an MCS used for communicating with the UE 502 (e.g., to improve reliability). Here, after receiving the MAC-CE including the information associated with the CLI, the network entity 504 may then perform one or more operations to further mitigate the impact of the CLI. In this way, the hybrid approach may improve communication reliability and network performance.

As indicated above, FIGS. 5A-5D are provided as examples. Other examples may differ from what is described with respect to FIGS. 5A-5D.

Figure 6:
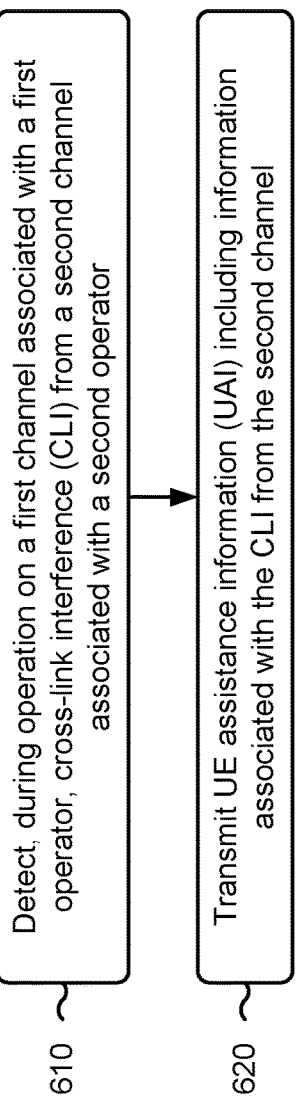

FIG. 6 is a diagram illustrating an example process 600 performed, for example, by a UE, in accordance with the present disclosure. Example process 600 is an example where the UE (e.g., UE 120) performs operations associated with detection and reporting of inter-operator inter-UE cross-link interference.

As shown in FIG. 6, in some aspects, process 600 may include detecting, during operation on a first channel associated with a first operator, CLI from a second channel associated with a second operator (block 610). For example, the UE (e.g., using communication manager 140 and/or CLI detection component 1208, depicted in FIG. 12) may detect, during operation on a first channel associated with a first operator, CLI from a second channel associated with a second operator, as described above.

As further shown in FIG. 6, in some aspects, process 600 may include transmitting UAI including information associated with the CLI from the second channel (block 620). For example, the UE (e.g., using communication manager 140 and/or transmission component 1204, depicted in FIG. 12) may transmit UAI including information associated with the CLI from the second channel, as described above.

Process 600 may include additional aspects, such as any single aspect or any combination of aspects described below and/or in connection with one or more other processes described elsewhere herein.

In a first aspect, the information associated with the CLI includes a binary indication indicating that the CLI was detected in the first channel.

In a second aspect, alone or in combination with the first aspect, the binary indication includes a bitmap comprising two or more bits, wherein each bit in the bitmap is associated with one or more channels.

In a third aspect, alone or in combination with one or more of the first and second aspects, the information associated with the CLI includes an indication of at least one of a strength of the CLI, a frequency location of the second channel, or one or more slots in which the CLI was detected.

In a fourth aspect, alone or in combination with one or more of the first through third aspects, the information associated with the CLI includes an indication of at least one of a component carrier preferred by the UE, a bandwidth part preferred by the UE, a downlink transmission power preferred by the UE, or a timing advance preferred by the UE.

In a fifth aspect, alone or in combination with one or more of the first through fourth aspects, the UAI is transmitted based at least in part on a time-based trigger associated with adjacent channel CLI reporting.

In a sixth aspect, alone or in combination with one or more of the first through fifth aspects, the UAI is transmitted based at least in part on an event-based trigger associated with adjacent channel CLI reporting.

In a seventh aspect, alone or in combination with one or more of the first through sixth aspects, process 600 includes transmitting UE capability information associated with detection or reporting of inter-operator CLI by the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network entity, in accordance with the present disclosure. Example process 700 is an example where the network entity (e.g., base station 110) performs operations associated with detection and reporting of inter-operator inter-UE cross-link interference.

As shown in FIG. 7, in some aspects, process 700 may include receiving UAI including information associated with CLI detected by a UE, wherein the UE is operating on a first channel associated with a first operator and the CLI is from a second channel associated with a second operator (block 710). For example, the network entity (e.g., using communication manager 150 and/or reception component 1302, depicted in FIG. 13) may receive UAI including information associated with CLI detected by a UE, wherein the UE is operating on a first channel associated with a first operator and the CLI is from a second channel associated with a second operator, as described above.

As further shown in FIG. 7, in some aspects, process 700 may include performing an operation associated with mitigating the CLI based at least in part on the information associated with the CLI (block 720). For example, the network entity (e.g., using communication manager 150 and/or CLI mitigation component 1308, depicted in FIG. 13) may perform an operation associated with mitigating the CLI based at least in part on the information associated with the CLI, as described above.

Process 700 may include additional aspects, such as any single aspect or any combination of aspects described below and/or in connection with one or more other processes described elsewhere herein.

In a first aspect, the information associated with the CLI includes a binary indication indicating that the CLI was detected in the first channel.

In a second aspect, alone or in combination with the first aspect, the binary indication includes a bitmap comprising two or more bits, wherein each bit in the bitmap is associated with one or more channels.

In a third aspect, alone or in combination with one or more of the first and second aspects, the information associated with the CLI includes an indication of at least one of a strength of the CLI, a frequency location of the second channel, or one or more slots in which the CLI was detected.

In a fourth aspect, alone or in combination with one or more of the first through third aspects, the information associated with the CLI includes an indication of at least one of a component carrier preferred by the UE, a bandwidth part preferred by the UE, a downlink transmission power preferred by the UE, or a timing advance preferred by the UE.

In a fifth aspect, alone or in combination with one or more of the first through fourth aspects, the operation associated with mitigating the CLI includes modifying a parameter associated with transmitting communications to the UE.

In a sixth aspect, alone or in combination with one or more of the first through fifth aspects, the operation associated with mitigating the CLI includes scheduling the UE on a resource selected based at least in part on the information associated with the CLI.

In a seventh aspect, alone or in combination with one or more of the first through sixth aspects, the operation associated with mitigating the CLI includes modifying a format of a slot to be used for communicating with the UE.

In an eighth aspect, alone or in combination with one or more of the first through seventh aspects, process 700 includes receiving UE capability information associated with detection or reporting of inter-operator CLI by the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
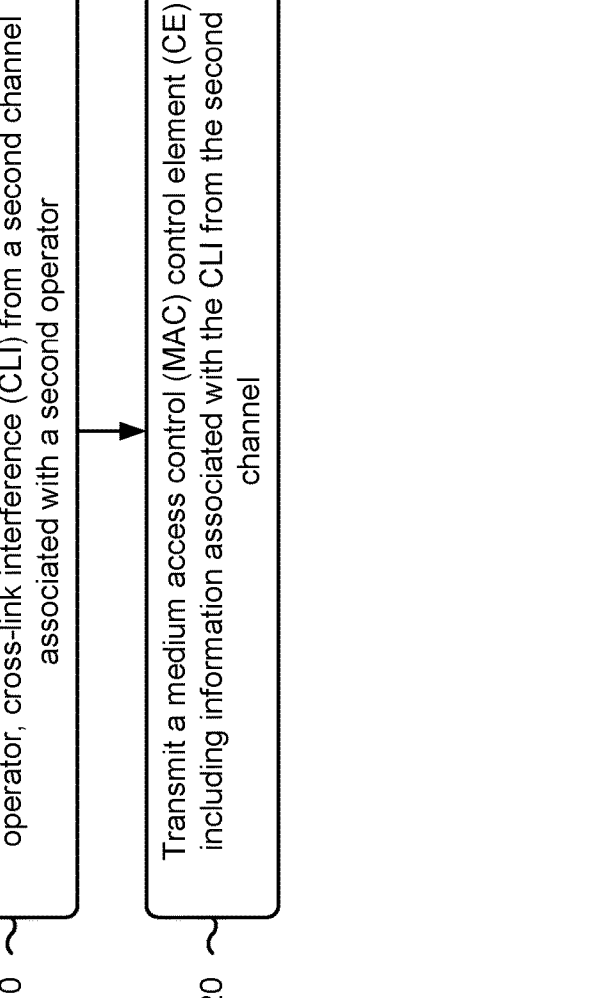

FIG. 8 is a diagram illustrating an example process 800 performed, for example, by a UE, in accordance with the present disclosure. Example process 800 is an example where the UE (e.g., UE 120) performs operations associated with detection and reporting of inter-operator inter-UE cross-link interference.

As shown in FIG. 8, in some aspects, process 800 may include detecting, during operation on a first channel associated with a first operator, CLI from a second channel associated with a second operator (block 810). For example, the UE (e.g., using communication manager 140 and/or CLI detection component 1208, depicted in FIG. 12) may detect, during operation on a first channel associated with a first operator, CLI from a second channel associated with a second operator, as described above.

As further shown in FIG. 8, in some aspects, process 800 may include transmitting a MAC-CE including information associated with the CLI from the second channel (block 820). For example, the UE (e.g., using communication manager 140 and/or transmission component 1204, depicted in FIG. 12) may transmit a MAC-CE including information associated with the CLI from the second channel, as described above.

Process 800 may include additional aspects, such as any single aspect or any combination of aspects described below and/or in connection with one or more other processes described elsewhere herein.

In a first aspect, the information associated with the CLI includes a binary indication indicating that the CLI was detected in the first channel.

In a second aspect, alone or in combination with the first aspect, the binary indication includes a bitmap comprising two or more bits, wherein each bit in the bitmap is associated with one or more channels.

In a third aspect, alone or in combination with one or more of the first and second aspects, the information associated with the CLI includes an indication of at least one of a strength of the CLI, a frequency location of the second channel, or one or more slots in which the CLI was detected.

In a fourth aspect, alone or in combination with one or more of the first through third aspects, the information associated with the CLI includes an indication of at least one of a component carrier preferred by the UE, a bandwidth part preferred by the UE, a downlink transmission power preferred by the UE, or a timing advance preferred by the UE.

In a fifth aspect, alone or in combination with one or more of the first through fourth aspects, the MAC-CE is transmitted based at least in part on a time-based trigger associated with adjacent channel CLI reporting.

In a sixth aspect, alone or in combination with one or more of the first through fifth aspects, the MAC-CE is transmitted based at least in part on an event-based trigger associated with adjacent channel CLI reporting.

In a seventh aspect, alone or in combination with one or more of the first through sixth aspects, process 800 includes transmitting UE capability information associated with detection or reporting of inter-operator CLI by the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a network entity, in accordance with the present disclosure. Example process 900 is an example where the network entity (e.g., base station 110) performs operations associated with detection and reporting of inter-operator inter-UE cross-link interference.

As shown in FIG. 9, in some aspects, process 900 may include receiving a MAC-CE including information associated with CLI detected by a UE, wherein the UE is operating on a first channel associated with a first operator and the CLI is from a second channel associated with a second operator (block 910). For example, the network entity (e.g., using communication manager 150 and/or reception component 1302, depicted in FIG. 13) may receive a MAC-CE including information associated with CLI detected by a UE, wherein the UE is operating on a first channel associated with a first operator and the CLI is from a second channel associated with a second operator, as described above.

As further shown in FIG. 9, in some aspects, process 900 may include performing an operation associated with mitigating the CLI based at least in part on the information associated with the CLI (block 920). For example, the network entity (e.g., using communication manager 150 and/or CLI mitigation component 1308, depicted in FIG. 13) may perform an operation associated with mitigating the CLI based at least in part on the information associated with the CLI, as described above.

Process 900 may include additional aspects, such as any single aspect or any combination of aspects described below and/or in connection with one or more other processes described elsewhere herein.

In a first aspect, the information associated with the CLI includes a binary indication indicating that the CLI was detected in the first channel.

In a second aspect, alone or in combination with the first aspect, the binary indication includes a bitmap comprising two or more bits, wherein each bit in the bitmap is associated with one or more channels.

In a third aspect, alone or in combination with one or more of the first and second aspects, the information associated with the CLI includes an indication of at least one of a strength of the CLI, a frequency location of the second channel, or one or more slots in which the CLI was detected.

In a fourth aspect, alone or in combination with one or more of the first through third aspects, the information associated with the CLI includes an indication of at least one of a component carrier preferred by the UE, a bandwidth part preferred by the UE, a downlink transmission power preferred by the UE, or a timing advance preferred by the UE.

In a fifth aspect, alone or in combination with one or more of the first through fourth aspects, the operation associated with mitigating the CLI includes modifying a parameter associated with transmitting communications to the UE.

In a sixth aspect, alone or in combination with one or more of the first through fifth aspects, the operation associated with mitigating the CLI includes scheduling the UE on a resource selected based at least in part on the information associated with the CLI.

In a seventh aspect, alone or in combination with one or more of the first through sixth aspects, the operation associated with mitigating the CLI includes modifying a format of a slot to be used for communicating with the UE.

In an eighth aspect, alone or in combination with one or more of the first through seventh aspects, process 900 includes receiving UE capability information associated with detection or reporting of inter-operator CLI by the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a UE, in accordance with the present disclosure. Example process 1000 is an example where the UE (e.g., UE 120) performs operations associated with detection and reporting of inter-operator inter-UE cross-link interference.

As shown in FIG. 10, in some aspects, process 1000 may include detecting, during operation on a first channel associated with a first operator, CLI from a second channel associated with a second operator (block 1010). For example, the UE (e.g., using communication manager 140 and/or CLI detection component 1208, depicted in FIG. 12) may detect, during operation on a first channel associated with a first operator, CLI from a second channel associated with a second operator, as described above.

As further shown in FIG. 10, in some aspects, process 1000 may include transmitting an L1 indication indicating that the CLI was detected (block 1020). For example, the UE (e.g., using communication manager 140 and/or transmission component 1204, depicted in FIG. 12) may transmit an L1 indication indicating that the CLI was detected, as described above.

As further shown in FIG. 10, in some aspects, process 1000 may include transmitting a MAC-CE including information associated with the CLI from the second channel, wherein the MAC-CE is transmitted after the L1 indication is transmitted (block 1030). For example, the UE (e.g., using communication manager 140 and/or transmission component 1204, depicted in FIG. 12) may transmit a MAC-CE including information associated with the CLI from the second channel, wherein the MAC-CE is transmitted after the L1 indication is transmitted, as described above.

Process 1000 may include additional aspects, such as any single aspect or any combination of aspects described below and/or in connection with one or more other processes described elsewhere herein.

In a first aspect, the L1 indication is transmitted in one or more bits of UCI.

In a second aspect, alone or in combination with the first aspect, the L1 indication is a binary indication indicating that the CLI was detected in the first channel.

In a third aspect, alone or in combination with one or more of the first and second aspects, the information associated with the CLI includes an indication of at least one of a strength of the CLI, a frequency location of the second channel, or one or more slots in which the CLI was detected.

In a fourth aspect, alone or in combination with one or more of the first through third aspects, the information associated with the CLI includes an indication of at least one of a component carrier preferred by the UE, a bandwidth part preferred by the UE, a downlink transmission power preferred by the UE, or a timing advance preferred by the UE.

In a fifth aspect, alone or in combination with one or more of the first through fourth aspects, process 1000 includes transmitting UE capability information associated with detection or reporting of inter-operator CLI by the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a network entity, in accordance with the present disclosure. Example process 1100 is an example where the network entity (e.g., base station 110) performs operations associated with detection and reporting of inter-operator inter-UE cross-link interference.

As shown in FIG. 11, in some aspects, process 1100 may include receiving an L1 indication indicating that CLI was detected by a UE, wherein the UE is operating on a first channel associated with a first operator and the CLI is from a second channel associated with a second operator (block 1110). For example, the network entity (e.g., using communication manager 150 and/or reception component 1302, depicted in FIG. 13) may receive an L1 indication indicating that CLI was detected by a UE, wherein the UE is operating on a first channel associated with a first operator and the CLI is from a second channel associated with a second operator, as described above.

As further shown in FIG. 11, in some aspects, process 1100 may include receiving a MAC-CE including information associated with the CLI detected by the UE, wherein the MAC-CE is received after the L1 indication is received (block 1120). For example, the network entity (e.g., using communication manager 150 and/or reception component 1302, depicted in FIG. 13) may receive a MAC-CE including information associated with the CLI detected by the UE, wherein the MAC-CE is received after the L1 indication is received, as described above.

As further shown in FIG. 11, in some aspects, process 1100 may include performing one or more operations associated with mitigating the CLI based at least in part on at least one of the L1 indication or the information associated with the CLI (block 1130). For example, the network entity (e.g., using communication manager 150 and/or CLI mitigation component 1308, depicted in FIG. 13) may perform one or more operations associated with mitigating the CLI based at least in part on at least one of the L1 indication or the information associated with the CLI, as described above.

Process 1100 may include additional aspects, such as any single aspect or any combination of aspects described below and/or in connection with one or more other processes described elsewhere herein.

In a first aspect, the L1 indication includes a binary indication indicating that the CLI was detected in the first channel.

In a second aspect, alone or in combination with the first aspect, the information associated with the CLI includes an indication of at least one of a strength of the CLI, a frequency location of the second channel, or one or more slots in which the CLI was detected.

In a third aspect, alone or in combination with one or more of the first and second aspects, the information associated with the CLI includes an indication of at least one of a component carrier preferred by the UE, a bandwidth part preferred by the UE, a downlink transmission power preferred by the UE, or a timing advance preferred by the UE.

In a fourth aspect, alone or in combination with one or more of the first through third aspects, the one or more operations associated with mitigating the CLI include modifying a parameter associated with transmitting communications to the UE.

In a fifth aspect, alone or in combination with one or more of the first through fourth aspects, the one or more operations associated with mitigating the CLI include scheduling the UE on a resource selected based at least in part on the information associated with the CLI.

In a sixth aspect, alone or in combination with one or more of the first through fifth aspects, the one or more operations associated with mitigating the CLI include modifying a format of a slot to be used for communicating with the UE.

In a seventh aspect, alone or in combination with one or more of the first through sixth aspects, performing one or more operations associated with mitigating the CLI comprises performing a first operation based at least in part on receiving the L1 indication, and performing a second operation based at least in part on the information associated with the CLI included in the MAC-CE.

In an eighth aspect, alone or in combination with one or more of the first through seventh aspects, process 1100 includes receiving UE capability information associated with detection or reporting of inter-operator CLI by the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
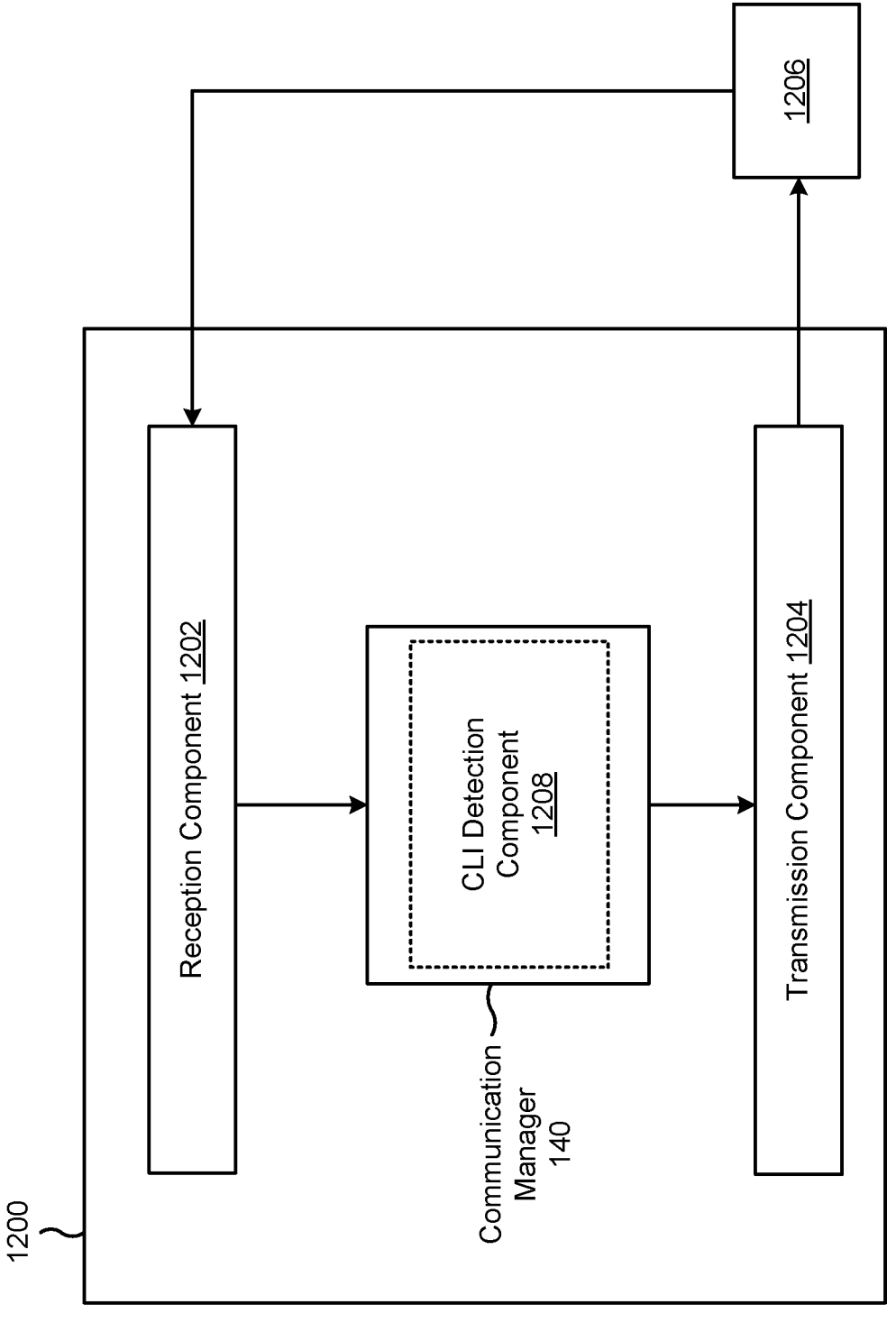
FIGS. 12 and 13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a CLI detection component 1208, among other examples.

In some aspects, the apparatus 1200 may be configured to perform one or more operations described herein in connection with FIGS. 5A-5D. Additionally, or alternatively, the apparatus 1200 may be configured to perform one or more processes described herein, such as process 600 of FIG. 6, process 800 of FIG. 8, process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The CLI detection component 1208 may detect, during operation on a first channel associated with a first operator, CLI from a second channel associated with a second operator. The transmission component 1204 may transmit UAI including information associated with the CLI from the second channel. The transmission component 1204 may transmit UE capability information associated with detection or reporting of inter-operator CLI by the UE.

The CLI detection component 1208 may detect, during operation on a first channel associated with a first operator, CLI from a second channel associated with a second operator. The transmission component 1204 may transmit a MAC-CE including information associated with the CLI from the second channel. The transmission component 1204 may transmit UE capability information associated with detection or reporting of inter-operator CLI by the UE.

The CLI detection component 1208 may detect, during operation on a first channel associated with a first operator, CLI from a second channel associated with a second operator. The transmission component 1204 may transmit an L1 indication indicating that the CLI was detected. The transmission component 1204 may transmit a MAC-CE including information associated with the CLI from the second channel, wherein the MAC-CE is transmitted after the L1 indication is transmitted. The transmission component 1204 may transmit UE capability information associated with detection or reporting of inter-operator CLI by the UE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
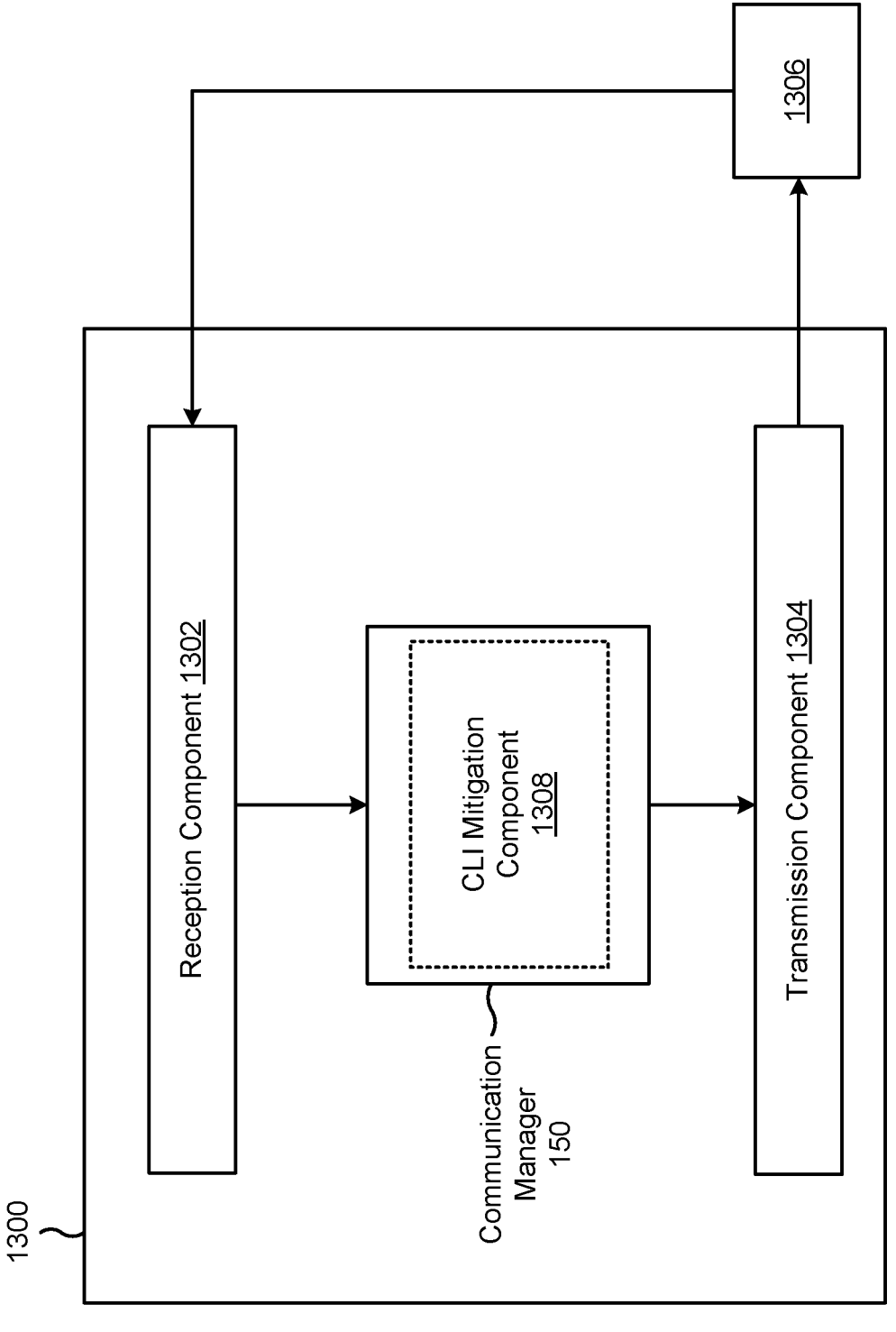

FIG. 13 is a diagram of an example apparatus 1300 for wireless communication. The apparatus 1300 may be a network entity, or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a CLI mitigation component 1308, among other examples.

In some aspects, the apparatus 1300 may be configured to perform one or more operations described herein in connection with FIGS. 5A-5D. Additionally, or alternatively, the apparatus 1300 may be configured to perform one or more processes described herein, such as process 700 of FIG. 7, process 900 of FIG. 9, process 1100 of FIG. 11, or a combination thereof. In some aspects, the apparatus 1300 and/or one or more components shown in FIG. 13 may include one or more components of the network entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity described in connection with FIG. 2. In some aspects, the transmission component 1304 may be co-located with the reception component 1302 in a transceiver.

The reception component 1302 may receive UAI including information associated with CLI detected by a UE, wherein the UE is operating on a first channel associated with a first operator and the CLI is from a second channel associated with a second operator. The CLI mitigation component 1308 may perform an operation associated with mitigating the CLI based at least in part on the information associated with the CLI. The reception component 1302 may receive UE capability information associated with detection or reporting of inter-operator CLI by the UE.

The reception component 1302 may receive a MAC-CE including information associated with CLI detected by a UE, wherein the UE is operating on a first channel associated with a first operator and the CLI is from a second channel associated with a second operator. The CLI mitigation component 1308 may perform an operation associated with mitigating the CLI based at least in part on the information associated with the CLI. The reception component 1302 may receive UE capability information associated with detection or reporting of inter-operator CLI by the UE.

The reception component 1302 may receive an L1 indication indicating that CLI was detected by a UE, wherein the UE is operating on a first channel associated with a first operator and the CLI is from a second channel associated with a second operator. The reception component 1302 may receive a MAC-CE including information associated with the CLI detected by the UE, wherein the MAC-CE is received after the L1 indication is received. The CLI mitigation component 1308 may perform one or more operations associated with mitigating the CLI based at least in part on at least one of the L1 indication or the information associated with the CLI. The reception component 1302 may receive UE capability information associated with detection or reporting of inter-operator CLI by the UE.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: detecting, during operation on a first channel associated with a first operator, CLI from a second channel associated with a second operator; and transmitting UAI including information associated with the CLI from the second channel.

Aspect 2: The method of Aspect 1, wherein the information associated with the CLI includes a binary indication indicating that the CLI was detected in the first channel.

Aspect 3: The method of Aspect 2, wherein the binary indication includes a bitmap comprising two or more bits, wherein each bit in the bitmap is associated with one or more channels.

Aspect 4: The method of any of Aspects 1-3, wherein the information associated with the CLI includes an indication of at least one of: a strength of the CLI, a frequency location of the second channel, or one or more slots in which the CLI was detected.

Aspect 5: The method of any of Aspects 1-4, wherein the information associated with the CLI includes an indication of at least one of a component carrier preferred by the UE, a bandwidth part preferred by the UE, a downlink transmission power preferred by the UE, or a timing advance preferred by the UE.

Aspect 6: The method of any of Aspects 1-5, wherein the UAI is transmitted based at least in part on a time-based trigger associated with adjacent channel CLI reporting.

Aspect 7: The method of any of Aspects 1-6, wherein the UAI is transmitted based at least in part on an event-based trigger associated with adjacent channel CLI reporting.

Aspect 8: The method of any of Aspects 1-7, further comprising transmitting UE capability information associated with detection or reporting of inter-operator CLI by the UE.

Aspect 9: A method of wireless communication performed by a network entity, comprising: receiving UAI including information associated with CLI detected by a UE, wherein the UE is operating on a first channel associated with a first operator and the CLI is from a second channel associated with a second operator; and performing an operation associated with mitigating the CLI based at least in part on the information associated with the CLI.

Aspect 10: The method of Aspect 9, wherein the information associated with the CLI includes a binary indication indicating that the CLI was detected in the first channel.

Aspect 11: The method of Aspect 10, wherein the binary indication includes a bitmap comprising two or more bits, wherein each bit in the bitmap is associated with one or more channels.

Aspect 12: The method of any of Aspects 9-11, wherein the information associated with the CLI includes an indication of at least one of a strength of the CLI, a frequency location of the second channel, or one or more slots in which the CLI was detected.

Aspect 13: The method of any of Aspects 9-12, wherein the information associated with the CLI includes an indication of at least one of: a component carrier preferred by the UE, a bandwidth part preferred by the UE, a downlink transmission power preferred by the UE, or a timing advance preferred by the UE.

Aspect 14: The method of Aspect any of Aspects 9-13, wherein the operation associated with mitigating the CLI includes modifying a parameter associated with transmitting communications to the UE.

Aspect 15: The method of any of Aspects 9-14, wherein the operation associated with mitigating the CLI includes scheduling the UE on a resource selected based at least in part on the information associated with the CLI.

Aspect 16: The method of any of Aspects 9-15, wherein the operation associated with mitigating the CLI includes modifying a format of a slot to be used for communicating with the UE.

Aspect 17: The method of any of Aspects 9-16, further comprising receiving UE capability information associated with detection or reporting of inter-operator CLI by the UE.

Aspect 18: A method of wireless communication performed by a UE, comprising: detecting, during operation on a first channel associated with a first operator, CLI from a second channel associated with a second operator; and transmitting a MAC-CE including information associated with the CLI from the second channel.

Aspect 19: The method of Aspect 18, wherein the information associated with the CLI includes a binary indication indicating that the CLI was detected in the first channel.

Aspect 20: The method of Aspect 19, wherein the binary indication includes a bitmap comprising two or more bits, wherein each bit in the bitmap is associated with one or more channels.

Aspect 21: The method of any of Aspects 18-20, wherein the information associated with the CLI includes an indication of at least one of: a strength of the CLI, a frequency location of the second channel, or one or more slots in which the CLI was detected.

Aspect 22: The method of any of Aspects 18-21, wherein the information associated with the CLI includes an indication of at least one of: a component carrier preferred by the UE, a bandwidth part preferred by the UE, a downlink transmission power preferred by the UE, or a timing advance preferred by the UE.

Aspect 23: The method of any of Aspects 18-22, wherein the MAC-CE is transmitted based at least in part on a time-based trigger associated with adjacent channel CLI reporting.

Aspect 24: The method of any of Aspects 18-23, wherein the MAC-CE is transmitted based at least in part on an event-based trigger associated with adjacent channel CLI reporting.

Aspect 25: The method of any of Aspects 18-24, further comprising transmitting UE capability information associated with detection or reporting of inter-operator CLI by the UE.

Aspect 26: A method of wireless communication performed by a network entity, comprising: receiving a MAC-CE including information associated with CLI detected by a UE, wherein the UE is operating on a first channel associated with a first operator and the CLI is from a second channel associated with a second operator; and performing an operation associated with mitigating the CLI based at least in part on the information associated with the CLI.

Aspect 27: The method of Aspect 26, wherein the information associated with the CLI includes a binary indication indicating that the CLI was detected in the first channel.

Aspect 28: The method of Aspect 27, wherein the binary indication includes a bitmap comprising two or more bits, wherein each bit in the bitmap is associated with one or more channels.

Aspect 29: The method of any of Aspects 26-28, wherein the information associated with the CLI includes an indication of at least one of: a strength of the CLI, a frequency location of the second channel, or one or more slots in which the CLI was detected.

Aspect 30: The method of any of Aspects 26-29, wherein the information associated with the CLI includes an indication of at least one of: a component carrier preferred by the UE, a bandwidth part preferred by the UE, a downlink transmission power preferred by the UE, or a timing advance preferred by the UE.

Aspect 31: The method of any of Aspects 26-30, wherein the operation associated with mitigating the CLI includes modifying a parameter associated with transmitting communications to the UE.

Aspect 32: The method of any of Aspects 26-31, wherein the operation associated with mitigating the CLI includes scheduling the UE on a resource selected based at least in part on the information associated with the CLI.

Aspect 33: The method of any of Aspects 26-32, wherein the operation associated with mitigating the CLI includes modifying a format of a slot to be used for communicating with the UE.

Aspect 34: The method of any of Aspects 26-33, further comprising receiving UE capability information associated with detection or reporting of inter-operator CLI by the UE.

Aspect 35: A method of wireless communication performed by a UE, comprising: detecting, during operation on a first channel associated with a first operator, CLI from a second channel associated with a second operator; transmitting an L1 indication indicating that the CLI was detected; and transmitting a MAC-CE including information associated with the CLI from the second channel, wherein the MAC-CE is transmitted after the L1 indication is transmitted.

Aspect 36: The method of Aspect 35, wherein the L1 indication is transmitted in one or more bits of UCI.

Aspect 37: The method of any of Aspects 35-36, wherein the L1 indication is a binary indication indicating that the CLI was detected in the first channel.

Aspect 38: The method of any of Aspects 35-37, wherein the information associated with the CLI includes an indication of at least one of: a strength of the CLI, a frequency location of the second channel, or one or more slots in which the CLI was detected.

Aspect 39: The method of any of Aspects 35-38, wherein the information associated with the CLI includes an indication of at least one of: a component carrier preferred by the UE, a bandwidth part preferred by the UE, a downlink transmission power preferred by the UE, or a timing advance preferred by the UE.

Aspect 40: The method of any of Aspects 35-39, further comprising transmitting UE capability information associated with detection or reporting of inter-operator CLI by the UE.

Aspect 41: A method of wireless communication performed by a network entity, comprising: receiving an L1 indication indicating that CLI was detected by a UE, wherein the UE is operating on a first channel associated with a first operator and the CLI is from a second channel associated with a second operator; receiving a MAC-CE including information associated with the CLI detected by the UE, wherein the MAC-CE is received after the L1 indication is received; and performing one or more operations associated with mitigating the CLI based at least in part on at least one of the L1 indication or the information associated with the CLI.

Aspect 42: The method of Aspect 41, wherein the L1 indication includes a binary indication indicating that the CLI was detected in the first channel.

Aspect 43: The method of any of Aspects 41-42, wherein the information associated with the CLI includes an indication of at least one of: a strength of the CLI, a frequency location of the second channel, or one or more slots in which the CLI was detected.

Aspect 44: The method of any of Aspects 41-43, wherein the information associated with the CLI includes an indication of at least one of: a component carrier preferred by the UE, a bandwidth part preferred by the UE, a downlink transmission power preferred by the UE, or a timing advance preferred by the UE.

Aspect 45: The method of any of Aspects 41-44, wherein the one or more operations associated with mitigating the CLI include modifying a parameter associated with transmitting communications to the UE.

Aspect 46: The method of any of Aspects 41-45, wherein the one or more operations associated with mitigating the CLI include scheduling the UE on a resource selected based at least in part on the information associated with the CLI.

Aspect 47: The method of any of Aspects 41-46, wherein the one or more operations associated with mitigating the CLI include modifying a format of a slot to be used for communicating with the UE.

Aspect 48: The method of any of Aspects 41-47, wherein performing one or more operations associated with mitigating the CLI comprises: performing a first operation based at least in part on receiving the L1 indication, and performing a second operation based at least in part on the information associated with the CLI included in the MAC-CE.

Aspect 49: The method of any of Aspects 41-48, further comprising receiving UE capability information associated with detection or reporting of inter-operator CLI by the UE.

Aspect 50: An apparatus for wireless communication at a device, comprising a processor; memory coupled with the processor; and instructions stored in the memory and executable by the processor to cause the apparatus to perform the method of one or more of Aspects 1-8.

Aspect 51: A device for wireless communication, comprising a memory and one or more processors coupled to the memory, the one or more processors configured to perform the method of one or more of Aspects 1-8.

Aspect 52: An apparatus for wireless communication, comprising at least one means for performing the method of one or more of Aspects 1-8.

Aspect 53: A non-transitory computer-readable medium storing code for wireless communication, the code comprising instructions executable by a processor to perform the method of one or more of Aspects 1-8.

Aspect 54: A non-transitory computer-readable medium storing a set of instructions for wireless communication, the set of instructions comprising one or more instructions that, when executed by one or more processors of a device, cause the device to perform the method of one or more of Aspects 1-8.

Aspect 55: An apparatus for wireless communication at a device, comprising a processor; memory coupled with the processor; and instructions stored in the memory and executable by the processor to cause the apparatus to perform the method of one or more of Aspects 9-17.

Aspect 56: A device for wireless communication, comprising a memory and one or more processors coupled to the memory, the one or more processors configured to perform the method of one or more of Aspects 9-17.

Aspect 57: An apparatus for wireless communication, comprising at least one means for performing the method of one or more of Aspects 9-17.

Aspect 58: A non-transitory computer-readable medium storing code for wireless communication, the code comprising instructions executable by a processor to perform the method of one or more of Aspects 9-17.

Aspect 59: A non-transitory computer-readable medium storing a set of instructions for wireless communication, the set of instructions comprising one or more instructions that, when executed by one or more processors of a device, cause the device to perform the method of one or more of Aspects 9-17.

Aspect 60: An apparatus for wireless communication at a device, comprising a processor; memory coupled with the processor; and instructions stored in the memory and executable by the processor to cause the apparatus to perform the method of one or more of Aspects 18-25.

Aspect 61: A device for wireless communication, comprising a memory and one or more processors coupled to the memory, the one or more processors configured to perform the method of one or more of Aspects 18-25.

Aspect 62: An apparatus for wireless communication, comprising at least one means for performing the method of one or more of Aspects 18-25.

Aspect 63: A non-transitory computer-readable medium storing code for wireless communication, the code comprising instructions executable by a processor to perform the method of one or more of Aspects 18-25.

Aspect 64: A non-transitory computer-readable medium storing a set of instructions for wireless communication, the set of instructions comprising one or more instructions that, when executed by one or more processors of a device, cause the device to perform the method of one or more of Aspects 18-25.

Aspect 65: An apparatus for wireless communication at a device, comprising a processor; memory coupled with the processor; and instructions stored in the memory and executable by the processor to cause the apparatus to perform the method of one or more of Aspects 26-34.

Aspect 66: A device for wireless communication, comprising a memory and one or more processors coupled to the memory, the one or more processors configured to perform the method of one or more of Aspects 26-34.

Aspect 67: An apparatus for wireless communication, comprising at least one means for performing the method of one or more of Aspects 26-34.

Aspect 68: A non-transitory computer-readable medium storing code for wireless communication, the code comprising instructions executable by a processor to perform the method of one or more of Aspects 26-34.

Aspect 69: A non-transitory computer-readable medium storing a set of instructions for wireless communication, the set of instructions comprising one or more instructions that, when executed by one or more processors of a device, cause the device to perform the method of one or more of Aspects 26-34.

Aspect 70: An apparatus for wireless communication at a device, comprising a processor; memory coupled with the processor; and instructions stored in the memory and executable by the processor to cause the apparatus to perform the method of one or more of Aspects 35-40.

Aspect 71: A device for wireless communication, comprising a memory and one or more processors coupled to the memory, the one or more processors configured to perform the method of one or more of Aspects 35-40.

Aspect 72: An apparatus for wireless communication, comprising at least one means for performing the method of one or more of Aspects 35-40.

Aspect 73: A non-transitory computer-readable medium storing code for wireless communication, the code comprising instructions executable by a processor to perform the method of one or more of Aspects 35-40.

Aspect 74: A non-transitory computer-readable medium storing a set of instructions for wireless communication, the set of instructions comprising one or more instructions that, when executed by one or more processors of a device, cause the device to perform the method of one or more of Aspects 35-40.

Aspect 75: An apparatus for wireless communication at a device, comprising a processor; memory coupled with the processor; and instructions stored in the memory and executable by the processor to cause the apparatus to perform the method of one or more of Aspects 41-49.

Aspect 76: A device for wireless communication, comprising a memory and one or more processors coupled to the memory, the one or more processors configured to perform the method of one or more of Aspects 41-49.

Aspect 77: An apparatus for wireless communication, comprising at least one means for performing the method of one or more of Aspects 41-49.

Aspect 78: A non-transitory computer-readable medium storing code for wireless communication, the code comprising instructions executable by a processor to perform the method of one or more of Aspects 41-49.

Aspect 79: A non-transitory computer-readable medium storing a set of instructions for wireless communication, the set of instructions comprising one or more instructions that, when executed by one or more processors of a device, cause the device to perform the method of one or more of Aspects 41-49.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      detect, during operation on a first channel associated with a first operator, cross-link interference (CLI) from a second channel associated with a second operator; and
      transmit information associated with the CLI from the second channel, wherein the information associated with the CLI includes a binary indication indicating that the CLI was detected in the first channel.

2. The UE of claim 1, wherein the information associated with the CLI is transmitted in UE assistance information.

3. The UE of claim 1, wherein the information associated with the CLI is transmitted in a medium access control (MAC) control element.

4. The UE of claim 1, wherein the binary indication includes a bitmap comprising two or more bits, wherein each bit in the bitmap is associated with one or more channels.

5. The UE of claim 1, wherein the information associated with the CLI includes an indication of at least one of:
   a strength of the CLI,
   a frequency location of the second channel, or
   one or more slots in which the CLI was detected.

6. The UE of claim 1, wherein the information associated with the CLI includes an indication of at least one of:
   a component carrier preferred by the UE,
   a bandwidth part preferred by the UE,
   a downlink transmission power preferred by the UE, or
   a timing advance preferred by the UE.

7. The UE of claim 1, wherein the information associated with the CLI is transmitted based at least in part on a time-based trigger associated with adjacent channel CLI reporting.

8. The UE of claim 1, wherein the information associated with the CLI is transmitted based at least in part on an event-based trigger associated with adjacent channel CLI reporting.

9. The UE of claim 1, wherein the one or more processors are further configured to transmit UE capability information associated with detection or reporting of inter-operator CLI by the UE.

10. The UE of claim 1, wherein one or more processors are further configured to transmit a layer 1 (L1) indication indicating that the CLI was detected, wherein the information associated with the CLI is transmitted after the L1 indication is transmitted.

11. The UE of claim 10, wherein the L1 indication is transmitted in one or more bits of uplink control information (UCI).

12. The UE of claim 10, wherein the L1 indication is the binary indication indicating that the CLI was detected in the first channel.

13. A network entity for wireless communication, comprising:
    a memory; and
    one or more processors, coupled to the memory, configured to:
       receive information associated with cross-link interference (CLI) detected by a user equipment (UE), wherein the UE is operating on a first channel associated with a first operator and the CLI is from a second channel associated with a second operator, wherein the information associated with the CLI includes a binary indication indicating that the CLI was detected in the first channel; and
       perform an operation associated with mitigating the CLI based at least in part on the information associated with the CLI.

14. The network entity of claim 13, wherein the information associated with the CLI is received in UE assistance information.

15. The network entity of claim 13, wherein the information associated with the CLI is received in a medium access control (MAC) control element.

16. The network entity of claim 14, wherein the binary indication includes a bitmap comprising two or more bits, wherein each bit in the bitmap is associated with one or more channels.

17. The network entity of claim 13, wherein the information associated with the CLI includes an indication of at least one of:
    a strength of the CLI, a frequency location of the second channel, or one or more slots in which the CLI was detected.

18. The network entity of claim 13, wherein the information associated with the CLI includes an indication of at least one of:

a component carrier preferred by the UE, a bandwidth part preferred by the UE, a downlink transmission power preferred by the UE, or a timing advance preferred by the UE.

19. The network entity of claim 13, wherein the operation associated with mitigating the CLI includes modifying a parameter associated with transmitting communications to the UE.

20. The network entity of claim 13, wherein the operation associated with mitigating the CLI includes scheduling the UE on a resource selected based at least in part on the information associated with the CLI.

21. The network entity of claim 13, wherein the operation associated with mitigating the CLI includes modifying a format of a slot to be used for communicating with the UE.

22. The network entity of claim 13, wherein the one or more processors are further configured to receive UE capability information associated with detection or reporting of inter-operator CLI by the UE.

23. The network entity of claim 13, wherein one or more processors are further configured to receive a layer 1 (L1) indication indicating that the CLI was detected, wherein the information associated with the CLI is received after the L1 indication is received.

24. The network entity of claim 23, wherein the L1 indication is received in one or more bits of uplink control information (UCI).

25. The network entity of claim 23, wherein the L1 indication is the binary indication indicating that the CLI was detected in the first channel.

26. The network entity of claim 23, wherein the one or more processors, to perform one or more operations associated with mitigating the CLI, are configured to:

perform a first operation based at least in part on receiving the L1 indication, and perform a second operation based at least in part on the information associated with the CLI.

27. A method of wireless communication performed by a user equipment (UE), comprising:

detecting, during operation on a first channel associated with a first operator, cross-link interference (CLI) from a second channel associated with a second operator; and transmitting information associated with the CLI from the second channel, wherein the information associated with the CLI includes a binary indication indicating that the CLI was detected in the first channel.

28. The method of claim 27, wherein the information associated with the CLI is transmitted in UE assistance information.

29. A method of wireless communication performed by a network entity, comprising:

receiving information associated with cross-link interference (CLI) detected by a user equipment (UE), wherein the UE is operating on a first channel associated with a first operator and the CLI is from a second channel associated with a second operator, wherein the information associated with the CLI includes a binary indication indicating that the CLI was detected in the first channel; and performing an operation associated with mitigating the CLI based at least in part on the information associated with the CLI.

30. The method of claim 29, wherein the information associated with the CLI is received in UE assistance information.

* * * * *